US012535525B2

(12) United States Patent
Kandula et al.

(10) Patent No.: US 12,535,525 B2
(45) Date of Patent: Jan. 27, 2026

(54) INTERFACE/UNICAST FOR TEST CONTENT, FIRMWARE, AND SOFTWARE DELIVERY

(71) Applicant: Altera Corporation, San Jose, CA (US)

(72) Inventors: Rakesh Kandula, Bangalore (IN); Sankaran Menon, Austin, TX (US); Seng Choon Thor, Bayan Lepas (MY); Shivaprashant Bulusu, Bangalore (IN); Eswar Vadlamani, Bengaluru (IN); Ramakrishnan Venkatasubramanian, Bangalore (IN)

(73) Assignee: Altera Corporation, San Jose, CA (US)

( * ) Notice: Subject to any disclaimer, the term of this patent is extended or adjusted under 35 U.S.C. 154(b) by 664 days.

(21) Appl. No.: 17/841,391

(22) Filed: Jun. 15, 2022

(65) Prior Publication Data

US 2023/0408581 A1 Dec. 21, 2023

(51) Int. Cl.
*G01R 31/3185* (2006.01)

(52) U.S. Cl.
CPC .......... *G01R 31/318536* (2013.01); *G01R 31/318544* (2013.01); *G01R 31/318555* (2013.01); *G01R 31/318561* (2013.01); *G01R 31/318563* (2013.01); *G01R 31/318572* (2013.01)

(58) Field of Classification Search
CPC .... G01R 31/318536; G01R 31/318544; G01R 31/318555; G01R 31/318561; G01R 31/318563; G01R 31/318572

USPC ......................................... 714/726, 727, 729
See application file for complete search history.

(56) References Cited

U.S. PATENT DOCUMENTS

| | | | | |
|---|---|---|---|---|
| 6,408,414 B1* | 6/2002 | Hatada | ........... | G01R 31/318555 714/727 |
| 8,522,189 B2* | 8/2013 | Patil | .................... | G06F 11/2242 716/136 |
| 11,639,962 B1* | 5/2023 | Patel | ................ | G01R 31/31704 714/726 |
| 11,662,383 B2* | 5/2023 | Sinha | ............... | G01R 31/31724 714/729 |
| 2022/0120811 A1* | 4/2022 | Sinha | ............. | G01R 31/318555 |
| 2023/0408581 A1* | 12/2023 | Kandula | ........ | G01R 31/318544 |

* cited by examiner

*Primary Examiner* — John J Tabone, Jr.
(74) *Attorney, Agent, or Firm* — Nicholson De Vos Webster & Elliott, LLP

(57) ABSTRACT

Techniques for interface conversion and unicast for test content, firmware, and software delivery are described. An example apparatus comprises a scan test interface coupled to multiple circuits blocks to perform a scan test for the multiple circuit blocks, and circuitry coupled to input/output (IO) signals of the scan test interface to provide content for the multiple circuit blocks and to deliver a replicated content to multiple endpoints of the multiple circuit blocks (e.g., unicast technology). In another example, the circuitry is coupled to the IO signals of the scan test interface and a system/communication interface to decode packets received at the IO signals and convert the decoded packets to provide content through the system/communication interface for the multiple circuit blocks. Other examples are described and claimed.

21 Claims, 19 Drawing Sheets

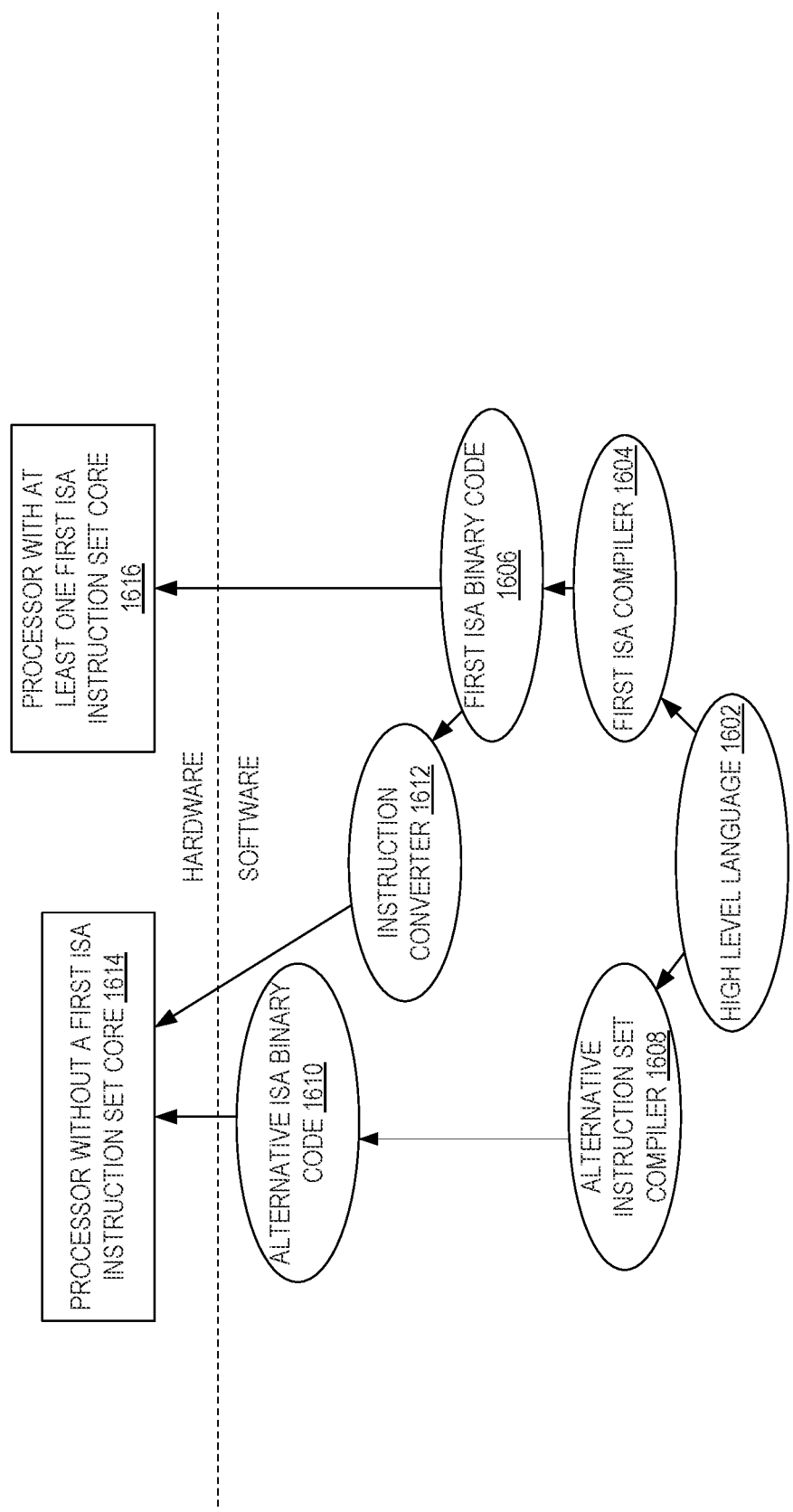

INTERFACE/UNICAST FOR TEST CONTENT, FIRMWARE, AND SOFTWARE DELIVERY

BACKGROUND

Components with a high pin count, finer pin pitch, and/or physically inaccessible pins (e.g., such as ball grid array (BGA) packages), present challenges for conventional test equipment such as probes, in-circuit testers, bed-of-nails fixtures, etc. Joint Test Action Group (JTAG) refers to an industry standard for verifying designs and testing printed circuit boards after manufacture. JTAG specifies various standards for on-chip circuitry, including the Institute of Electrical and Electronics Engineers (IEEE) Standard 1149.1-1990, Standard Test Access Port and Boundary-Scan Architecture, and several updates thereto. In some implementations, a dedicated debug port may be utilized to provide a serial communications interface for low-overhead access without requiring direct external access to the system address and data buses. The serial interface connects to an on-chip test access port (TAP), and a specified protocol may be utilized to access a set of test registers that present chip logic levels and device capabilities of various parts. IEEE 1687 is a proposed standard, sometimes also referred to as internal JTAG (IJTAG), related to the access and operation of embedded components.

Streaming Scan Network (SSN) refers to a packetized data network for scan testing. SSN is a bus-based scan data distribution architecture that enables simultaneous testing of a number of cores even with few chip inputs/outputs. SSN may reduce test time in some situations by enabling high-speed data distribution, by handling imbalances between cores, and by supporting testing of any number of identical cores with a constant cost. SSN may provide an interface in each core that is suited for abutted tiles, and may simplify scan timing closure.

BRIEF DESCRIPTION OF DRAWINGS

Various examples in accordance with the present disclosure will be described with reference to the drawings, in which:

FIG. 16 is a block diagram illustrating the use of a software instruction converter to convert binary instructions in a source instruction set architecture to binary instructions in a target instruction set architecture according to examples.

DETAILED DESCRIPTION

Figure 1A:
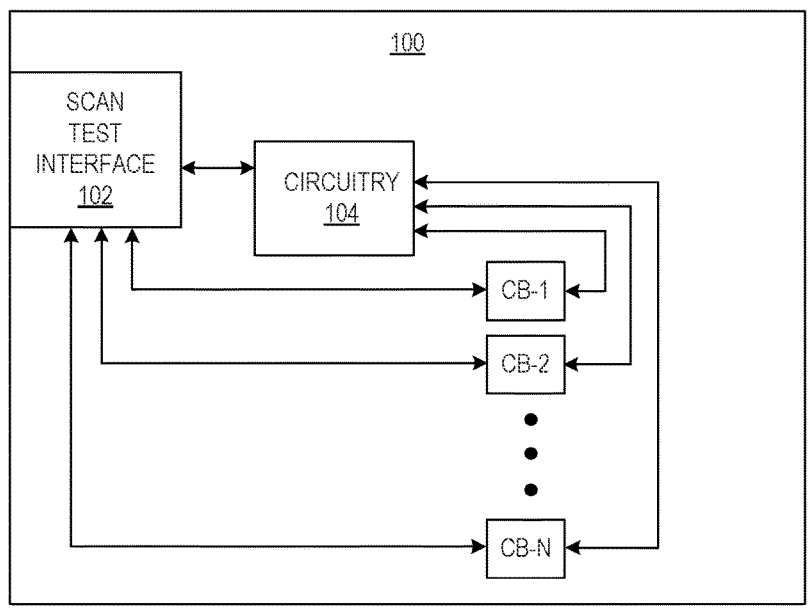
FIG. 1A is a block diagram of an apparatus with unicast technology for test content, firmware, and software delivery in one implementation.

The present disclosure relates to methods, apparatus, systems, and non-transitory computer-readable storage media for interface technology and/or unicast technology for content, firmware, and/or software delivery. According to some examples, the technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide interface technology and/or unicast technology for content, firmware, and/or software delivery.

In the following description, numerous details are discussed to provide a more thorough explanation of the examples of the present disclosure. It will be apparent to one skilled in the art, however, that examples of the present disclosure may be practiced without these specific details. In other instances, well-known structures and devices are shown in block diagram form, rather than in detail, in order to avoid obscuring examples of the present disclosure.

Note that in the corresponding drawings of the examples, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary examples to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the examples of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In electronic design, a semiconductor intellectual property (IP) core (SIP core), IP core, or IP block may refer to a reusable unit of logic, cell, or integrated circuit (IC) layout design. For example, ICs such as application-specific integrated circuits (ASICs), systems of field-programmable gate array (FPGA) logic, system-on-chips (SOCs), etc., may use IP blocks as part of an IC device design. As used herein, a circuit block refers to a unit of logic, cell, or integrated circuit (IC) layout design, and encompasses re-usable blocks such as IP blocks.

JTAG technology may provide access to numerous logic signals of an integrated circuit, including the device pins. The signals are accessible via the test access port (TAP). An integrated circuit that is JTAG compliant generally includes the JTAG interface internally and provides external pins to access the TAP. For different implementations, two, four, or five pins may be provided. The JTAG pins are defined as Test Data In (TDI), Test Data Out (TDO), Test Clock (TCK), Test Mode Select (TMS), and optionally Test Reset (TRST). The four and five pin interfaces support multiple chips with the TAP of each chip daisy-chained together, under certain conditions. The two pin interface supports multiple chips connected in a star topology. For either the daisy-chain or star topology, a single JTAG port may be connected to a test probe to provide access to the chips. FIG. 1B shows an example of a packetized scan test interface that reuses the SSN pins (e.g., and not the SSN scan test interface) for sending the test content for testing purposes. Some examples may also reuse the SSN pins for software/firmware content delivery.

In some compute systems, the JTAG interface may be used for delivery of firmware (FW), software (SW) and test content. The JTAG interface provides a common interoperable standard IEEE1149.1 interface, but the JTAG interface is a comparatively slow interface running at a maximum of approximately 50 Mhz to 100 Mhz and a serial interface with TDI/TDO. Transferring a large amount of test/FW/SW content may take a long time, especially if multiple interfaces are to be tested. A streaming scan network (SSN) interface may be faster, but involves dedicated pins utilized for scan testing. For systems that have multiple input/output (IO) interfaces of identical functionality, another problem is that each of the multiple IO interfaces requires a large amount of data to be transferred through the interface to test the multiple IO interfaces. Some examples described herein may overcome one or more of the foregoing problems.

Some examples reuse the scan test pins used for SSN with unicast technology to deliver replicated content (such as test content, FW/SW content) to multiple endpoints (e.g., multiple substantially identical or functionally equivalent endpoints that utilize the same content). Additionally, or alternatively, some examples described herein may provide a packetized interface and conversion technology to convert decoded packets from the packetized interface IO pins to deliver system content through a system/communication interface. In some examples, an interface architecture may provide a faster interface by using SSN pins for packetized scan testing (e.g., where the SSN interface provides a parallel packetized interface for scan content delivery) and re-using the same SSN pins for delivering test, FW, and SW content in a packetized manner (e.g., for higher speed transferring of test, FW, and SW content for calibration and/or testing of fast IO interfaces such as serializer/deserializer (SERDES) interfaces, peripheral component interconnect express (PCIe) interfaces, etc.).

Figure 1B:
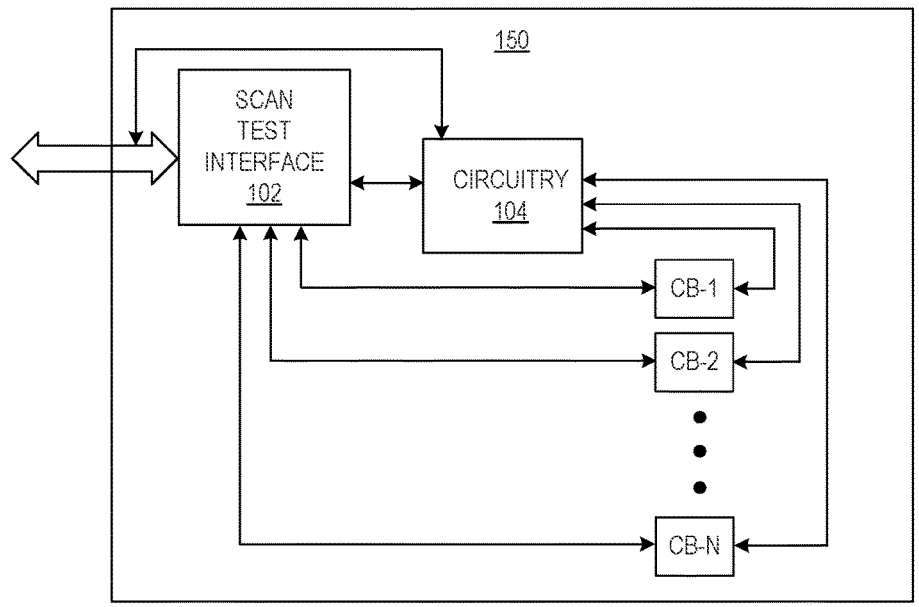
FIG. 1B is a block diagram of another apparatus with unicast technology for test content, firmware, and software delivery in one implementation.

FIG. 1A shows an example of an apparatus 100 that includes two or more circuit blocks (e.g., CB-1 through CB-N), a scan test interface 102 (e.g., a JTAG interface, an SSN interface. etc.) coupled to the two or more circuits blocks to perform a scan test for the two or more circuit blocks, and circuitry 104 coupled to IO signals (e.g., JTAG pins, SSN pins, etc.) of the scan test interface 102 to provide content for the two or more circuit blocks and to deliver a replicated content to multiple endpoints of the two or more circuit blocks (e.g., with unicast technology as described in further detail below). In some examples, the circuitry 104 may be configured to determine respective addresses of the multiple endpoints based on stored configuration information. For example, the circuitry 104 may be configured to determine the respective addresses of the multiple endpoints based on respective base addresses of each endpoint of the multiple endpoints stored in the configuration information and an offset received through the IO signals of the scan test interface 102. For example, any of the circuit blocks may be an endpoint or may include one or more endpoints for the content. In some examples, content that is written to the two or more blocks (e.g., or that is otherwise accessible from the two or more blocks) may also be read-back via the same IO signals of the interface 102 (e.g., SSN or JTAG output pins).

For example, the apparatus 100 may be incorporated in a SoC, a network-on-a-chip (NoC), or any of the systems/devices described herein. In one example, various elements of the apparatus 100 may be included in the system 1100. In particular, the circuitry 104 may be integrated with the PCU 1117.

FIG. 1B shows an example of another apparatus 150 that includes similar elements as the apparatus 100 indicated by like reference labels. As illustrated in FIG. 1B, the scan test interface 102 may be completely or partially bypassed and the circuitry 104 may only use the IO signals (e.g., JTAG pins, SSN pins, etc.) that are coupled to both the scan test interface 102 and the circuitry 104 for IO test content delivery and for SW/FW content delivery. For example, the apparatus 150 may be incorporated in a SoC, a NoC, or any of the systems/devices described herein. In one example, various elements of the apparatus 150 may be included in the system 1100. In particular, the circuitry 104 may be integrated with the PCU 1117.

Figure 2A:
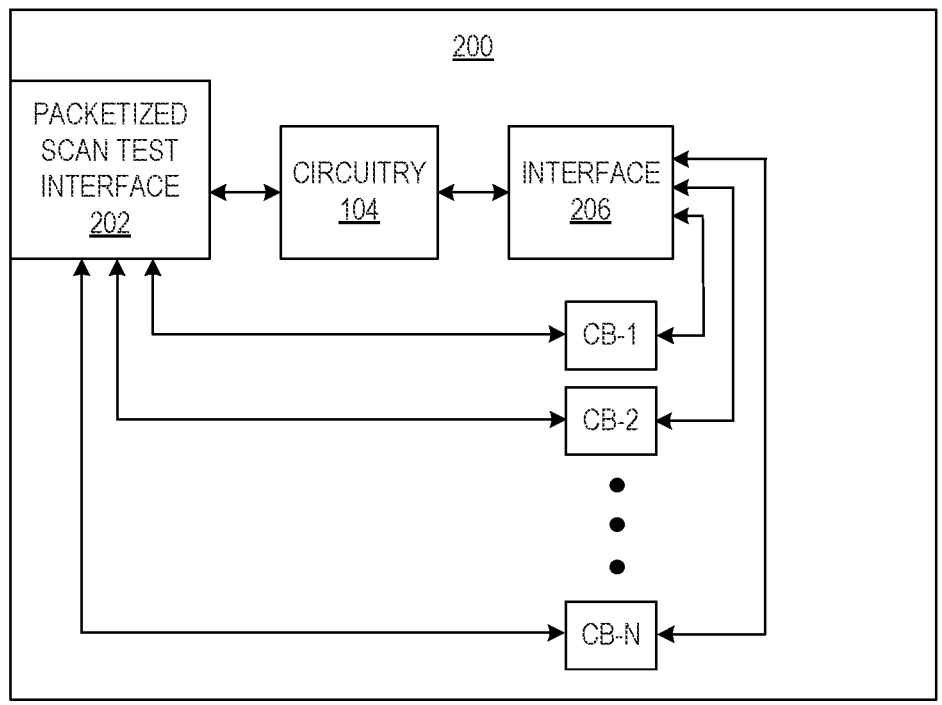
FIG. 2A is a block diagram of another apparatus with unicast technology and optional interface conversion technology for test content, firmware, and software delivery in one implementation.

FIG. 2A shows an example of another apparatus 200 that includes similar elements as the apparatus 100 indicated by like reference labels. In FIG. 2A, the scan test interface comprises a packetized scan test interface 202 (e.g., an SSN interface, etc.), and the apparatus 200 further comprises a second interface 206 (e.g., one or more of a system interface and a communication interface) coupled to the two or more circuit blocks to provide address and data-based access to the two or more circuit blocks. For example, the packetized scan test interface 202 may be utilized for automatic test packet generation (ATPG) scan testing. As shown in FIG. 2A, the circuitry 104 may be coupled to the IO signals of the packetized scan test interface 202 and the interface 206. For example, the circuitry 104 may be coupled to external pins or a port of the interface 202 (e.g., SSN pins) and may be configured to connect the pins/port to either the interface 202 (e.g., when the scan test is enabled) or to the circuitry 104 (e.g., when the scan test is not enabled). In some examples, the circuitry 104 utilizes only the pins/port of the interface 202 and none of the other logic/circuitry of the interface 202 is utilized by the circuitry 104.

In this example, the circuitry 104 may be further configured to decode packets received at the IO signals and convert the decoded packets to provide content through the interface 206 for the two or more circuit blocks. The circuitry 104 may also be configured to selectively utilize the packetized scan test interface 202 to perform the scan test for the two or more circuit blocks and interface 206 to provide content to the two or more circuit blocks (e.g., content received at the IO signals). In some examples, the circuitry 104 may be further configured to determine the respective addresses of the multiple endpoints based on respective base addresses of each endpoint of the multiple endpoints stored in configuration information and an offset indicated in a decoded packet received through the IO signals of the packetized scan test interface 202, and/or to convert the decoded packets into one or more of system memory address space and high-speed IO address space. In some examples, content that is written to the two or more blocks (e.g., or otherwise accessible from the two or more blocks) may also be read-back via the same IO signals of the interface 102 (e.g., SSN output pins).

For example, the apparatus 200 may be incorporated in a SoC, a network-on-a-chip (NoC), or any of the systems/devices described herein. In one example, various elements of the apparatus 200 may be included in the system 1100. In particular, the circuitry 104 may be integrated with the PCU 1117.

Figure 2B:
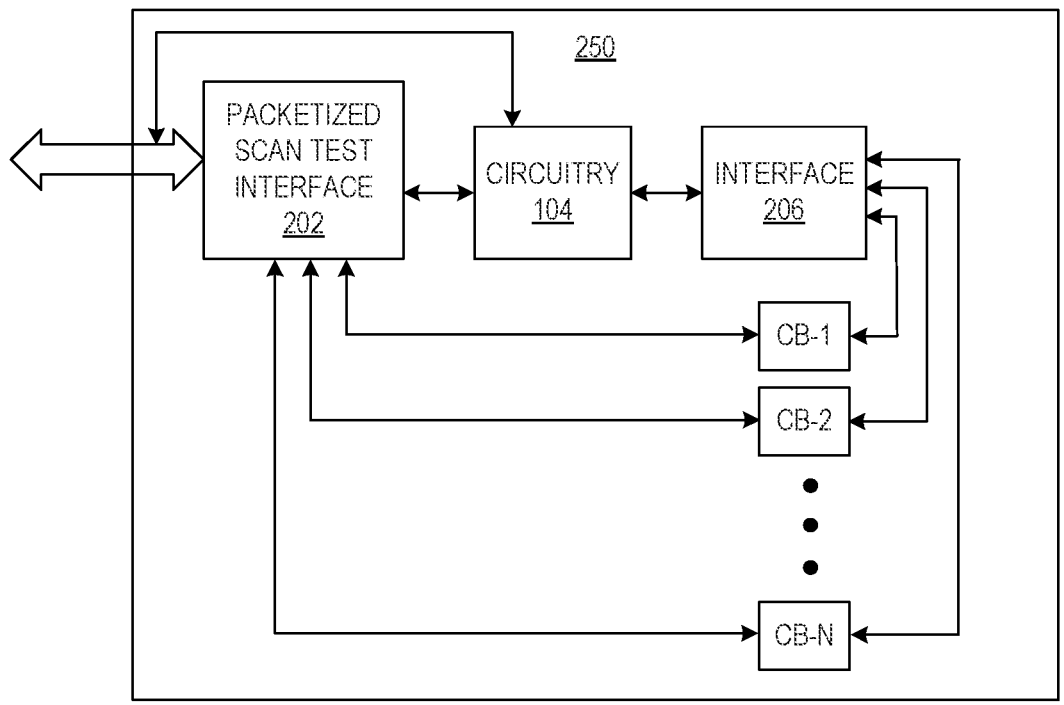
FIG. 2B is a block diagram of another apparatus with unicast technology and optional interface conversion technology for test content, firmware, and software delivery in one implementation.

FIG. 2B shows an example of another apparatus 150 that includes similar elements as the apparatus 200 and the apparatus 100 indicated by like reference labels. As illustrated in FIG. 2B, the packetized scan test interface 202 may be completely or partially bypassed and the circuitry 104 may only use the IO signals (e.g., SSN pins, etc.) that are coupled to both the packetized scan test interface 202 and the circuitry 104 for IO test content delivery and for SW/FW content delivery. For example, the apparatus 250 may be incorporated in a SoC, a NoC, or any of the systems/devices described herein. In one example, various elements of the apparatus 250 may be included in the system 1100. In particular, the circuitry 104 may be integrated with the PCU 1117.

Figure 3A:
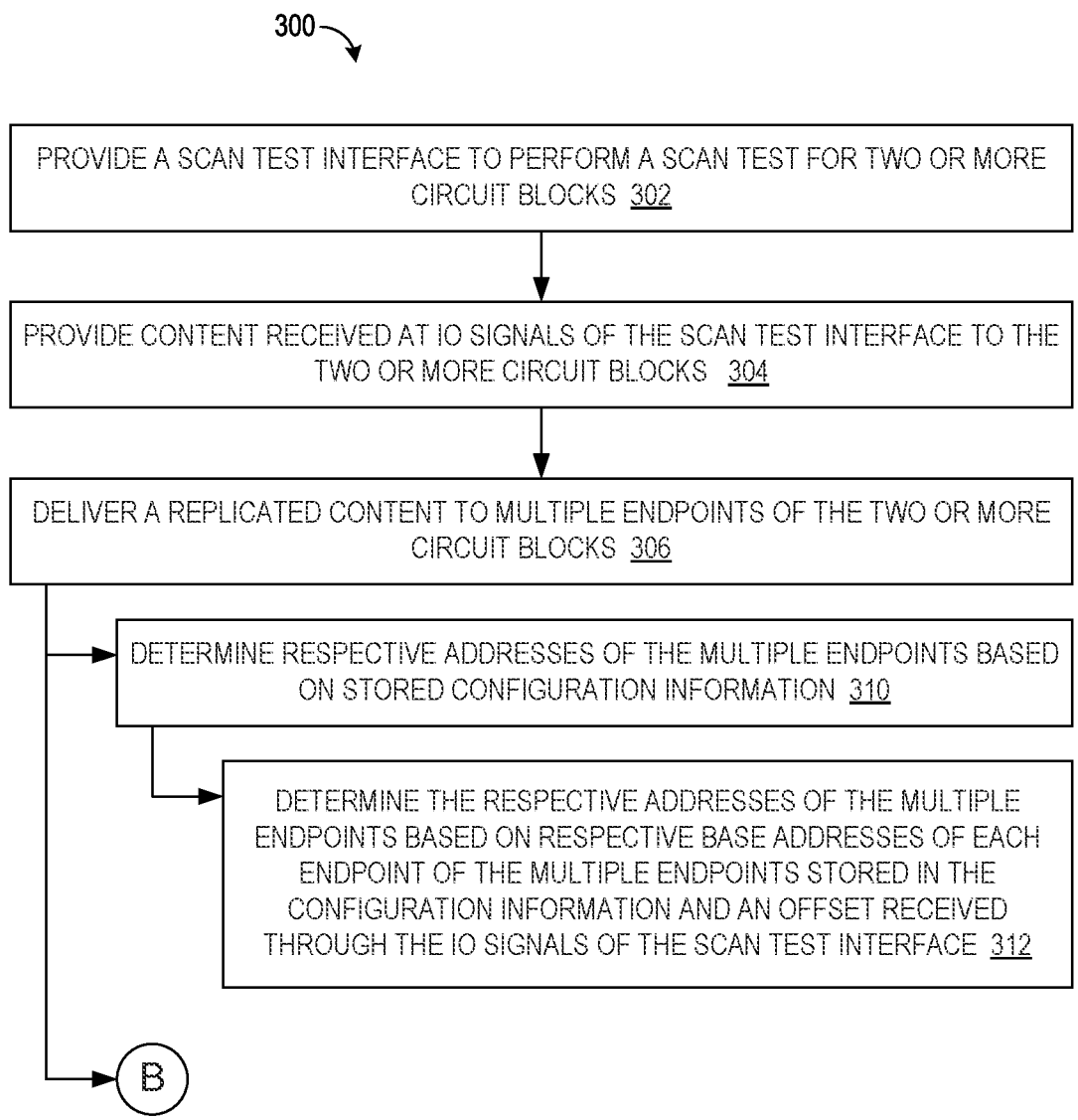
FIGS. 3A to 3B are illustrative diagrams of a method for unicasting and optional interface converting for test content, firmware, and software delivery in one implementation.
Figure 3B:
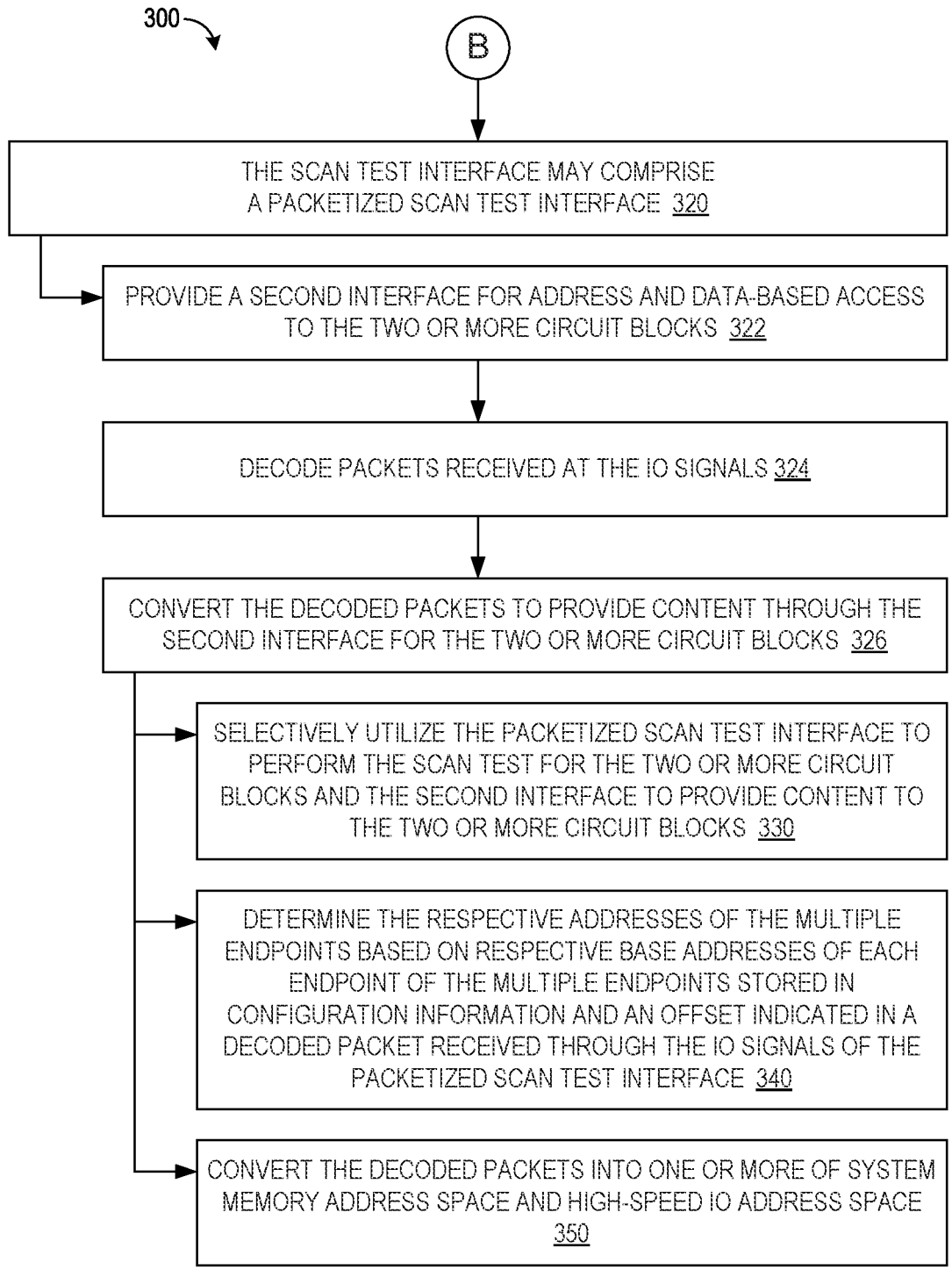

FIGS. 3A to 3B show an example of a method 300 that may include providing a scan test interface to perform a scan test for two or more circuit blocks at 302, providing content received at IO signals of the scan test interface to the two or more circuit blocks at 304, and delivering a replicated content to multiple endpoints of the two or more circuit blocks at 306. For example, the replicated content is not sent by the tester but instead may be replicated by suitable hardware circuitry (e.g., the circuitry 104). The method 300 may further include determining respective addresses of the multiple endpoints based on stored configuration information at 310. For example, the method 300 may include determining the respective addresses of the multiple endpoints based on respective base addresses of each endpoint of the multiple endpoints stored in the configuration information and an offset received through the IO signals of the scan test interface at 312.

In some examples, the scan test interface may comprise a packetized scan test interface at 320, and the method 300 may further include providing a second interface (e.g., a functional interface) for address and data-based access to the two or more circuit blocks at 322, decoding packets received at the IO signals at 324, and converting the decoded packets to provide content through the second interface for the two or more circuit blocks at 326. For example, the method 300 may also include selectively utilizing the packetized scan test interface to perform the scan test for the two or more circuit blocks and the second interface to provide content to the two or more circuit blocks at 330, determining the respective addresses of the multiple endpoints based on respective base addresses of each endpoint of the multiple endpoints stored in configuration information and an offset indicated in a decoded packet received through the IO signals of the packetized scan test interface at 340, and/or converting the decoded packets into one or more of system memory address space and high-speed IO address space at 350.

For example, the method 300 may be performed by a SoC, a network-on-a-chip (NoC), or any of the systems/devices described herein. In one example, various aspects of the method 300 may be performed in the system 1100. In particular, various aspects of the method 300 may be performed by the processor 1170, the processor/coprocessor 1180, and/or the PCU 1117.

Figure 4:
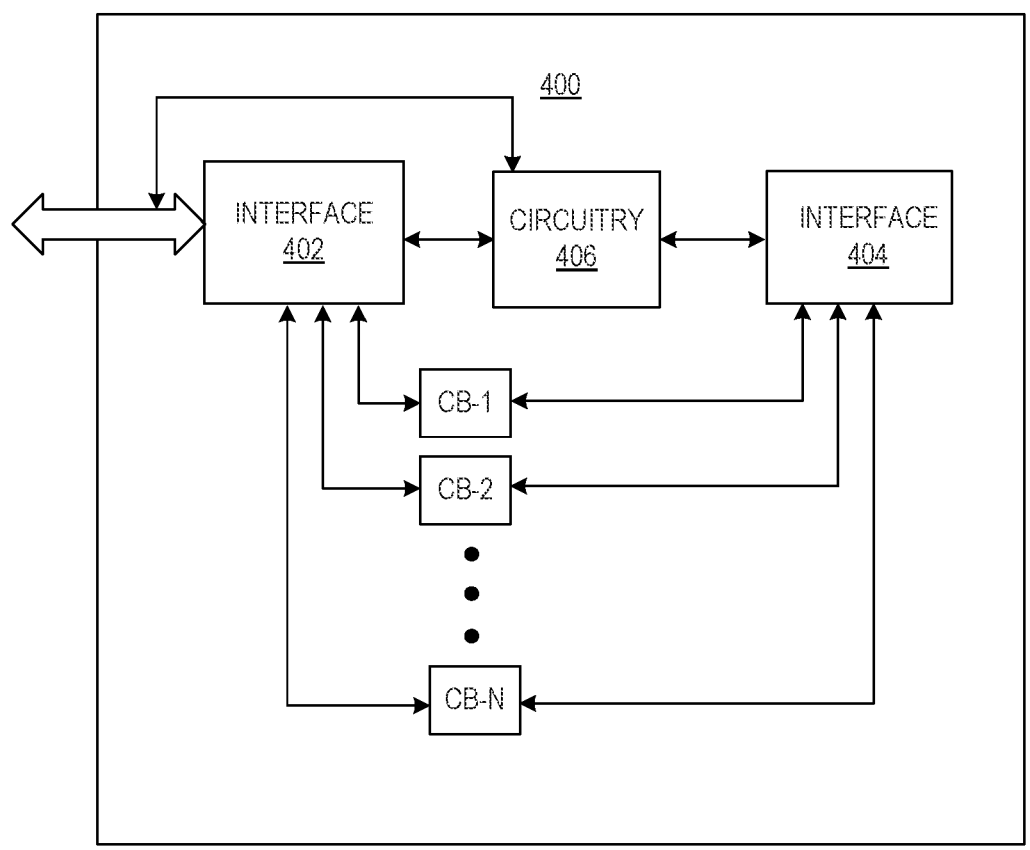
FIG. 4 is a block diagram of another apparatus with interface conversion technology and optional unicast technology for test content, firmware, and software delivery in one implementation.

FIG. 4 shows an example of an apparatus 400 that includes two or more circuit blocks (e.g., CB-1 through CB-N), a first interface 402 coupled to the two or more circuits blocks to decode packets to perform a scan test for the two or more circuit blocks, a second interface 404 coupled to the two or more circuit blocks to provide to provide address and data-based access to the two or more circuit blocks, and circuitry 406 coupled to the interface 402 and the interface 404 to decode packets for the interface 404 and convert the decoded packets to provide content through the interface 404 for the two or more circuit blocks. For example, the content may be one or more of test content, firmware, and software.

In some examples, the interface 402 may comprise a packetized scan test interface (e.g., such as SSN) and the circuitry 406 may be configured to selectively utilize the packetized scan test interface to perform the scan test for the two or more circuit blocks and the interface 404 to provide content to the two or more circuit blocks (e.g., utilizing only the pins/port of the interface 402 and otherwise bypassing the interface 402). For example, the circuitry 406 may be coupled to external pins or a port of the interface 402 (e.g., SSN pins) and be configured to connect the pins/port to either the interface 402 (e.g., when the scan test is enabled) or to the circuitry 406 (e.g., when the scan test is not enabled). In some examples, the circuitry 406 utilizes only the pins/port of the interface 402 and none of the other logic/circuitry of the interface 402 is utilized by the circuitry 406.

In some examples, the interface 404 may comprise one or more of a system interface and a communication interface, and the circuitry 406 may be configured to convert the decoded packets into system memory address space, and/or to convert the decoded packets into high-speed IO address space. In some examples, the circuitry 406 may be further configured to deliver a replicated content from one or more decoded packets to multiple endpoints of the two or more circuit blocks (e.g., with optional unicast technology as described in further detail below). For example, the circuitry 406 may also be configured to determine respective addresses of the multiple endpoints based on stored configuration information. In some examples, content that is written to the two or more blocks (e.g., or otherwise accessible from the two or more blocks) may also be read-back via the same external pins or a port of the interface 402 (e.g., SSN output pins).

For example, the apparatus 400 may be incorporated in a SoC, a network-on-a-chip (NoC), or any of the systems/devices described herein. In one example, various elements of the apparatus 400 may be included in the system 1100. In particular, the circuitry 406 may be integrated with the PCU 1117.

Figure 5A:
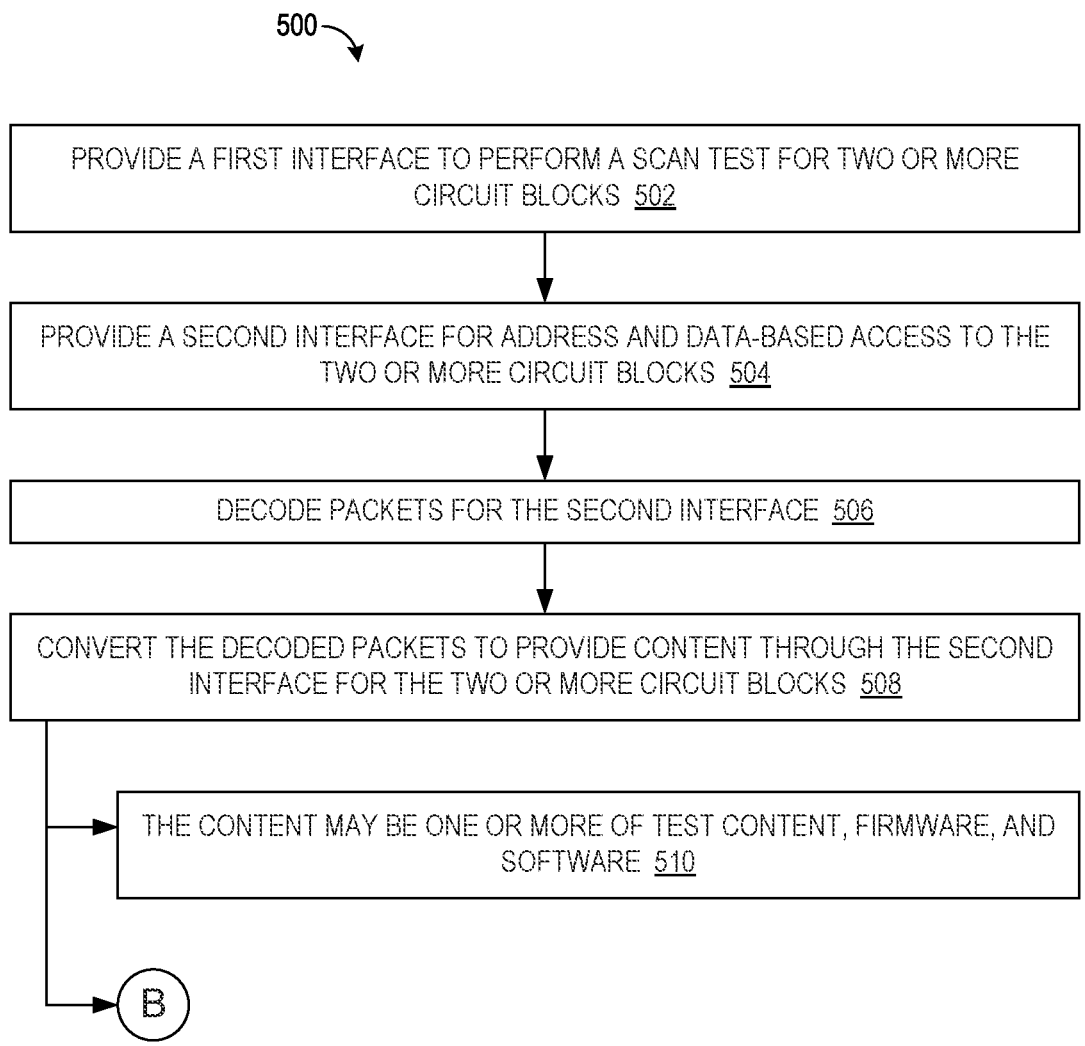
FIGS. 5A to 5B are illustrative diagrams of a method for interface converting and optional unicasting for test content, firmware, and software delivery in one implementation.
Figure 5B:
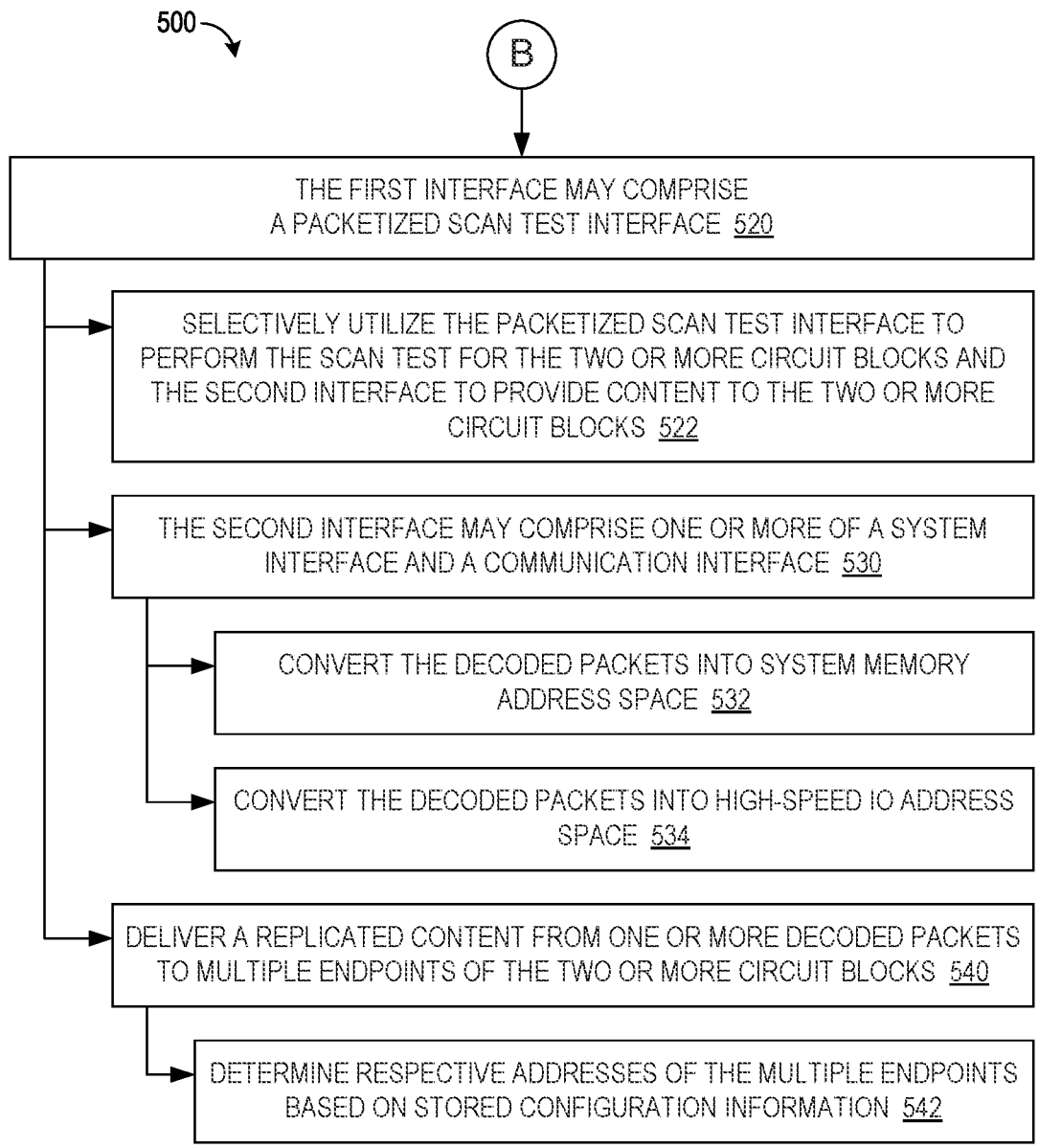

FIGS. 5A to 5B show an example of a method 500 that includes comprising providing a first interface to perform a scan test for two or more circuit blocks at 502, providing a second interface for address and data-based access to the two or more circuit blocks at 504, decoding packets for the second interface at 506 (e.g., received at IO pins shared between the first and second interfaces), and converting the decoded packets to provide content through the second interface for the two or more circuit blocks at 508. For example, the content may be one or more of test content, firmware, and software at 510.

In some examples, the first interface may comprise a packetized scan test interface at 520, and the method 500 may further include selectively utilizing the packetized scan test interface to perform the scan test for the two or more circuit blocks and the second interface to provide content to the two or more circuit blocks at 522. In some examples, the second interface may comprise one or more of a system interface and a communication interface at 530, and the method 500 may further include converting the decoded packets into system memory address space at 532, and/or converting the decoded packets into high-speed IO address space at 534. In some examples, the method 500 may further include delivering a replicated content from one or more decoded packets to multiple endpoints of the two or more circuit blocks at 540. For example, the method 500 may also include determining respective addresses of the multiple endpoints based on stored configuration information at 542.

For example, the method 500 may be performed by a SoC, a network-on-a-chip (NoC), or any of the systems/devices described herein. In one example, various aspects of the method 500 may be performed in the system 1100. In particular, various aspects of the method 500 may be performed by the processor 1170, the processor/coprocessor 1180, and/or the PCU 1117.

Figure 6A:
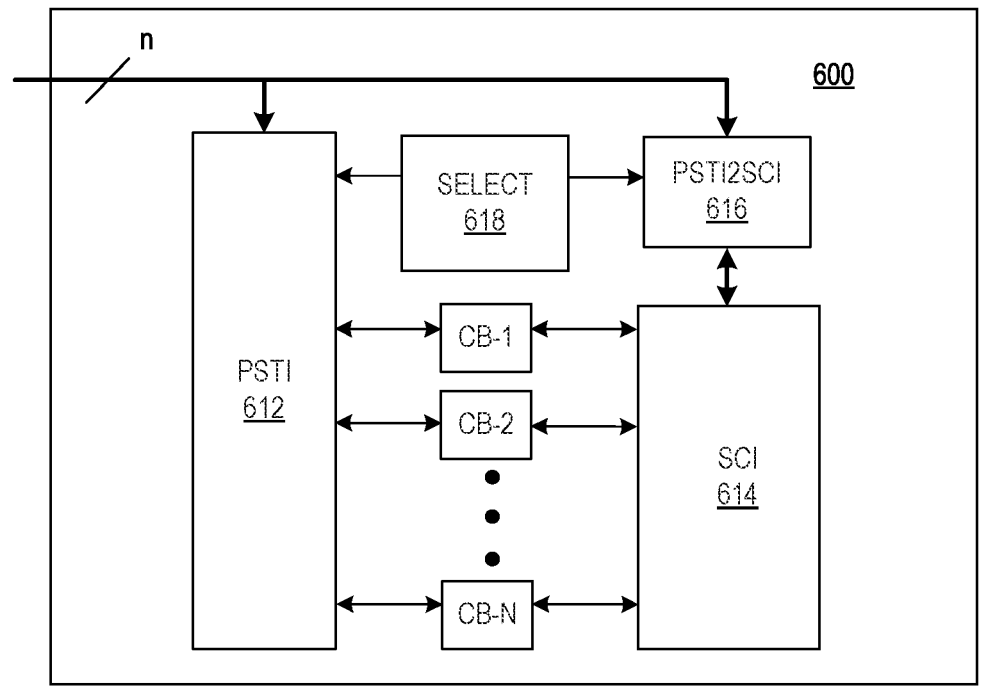
FIG. 6A is a block diagram of another apparatus with interface/unicast technology for test content, firmware, and software delivery in one implementation.

FIG. 6A shows an example of an apparatus 600 that includes two or more circuit blocks (e.g., CB-1 through CB-N), a packetized scan test interface (PSTI) 612 coupled to the two or more circuits blocks to decode packets to perform a scan test for the two or more circuit blocks, a system/communication interface (SCI) 614 coupled to the two or more circuit blocks to provide to provide address and data-based access to the two or more circuit blocks, and a PSTI2SCI block 616 coupled to the SCI 614 to decode packets received by the PSTI2SCI block 616 and convert the decoded packets to provide content through the SCI 614 for the two or more circuit blocks. For example, the content may be one or more of test content, firmware, and software. In some examples, the PSTI2SCI block 616 may be configured to convert the decoded packets into system memory address space, and/or to convert the decoded packets into high-speed IO address space. In some examples, the PSTI2SCI block 616 may include unicast technology to deliver a replicated content from one or more decoded packets to multiple endpoints of the two or more circuit blocks (e.g., as described in further detail below). For example, the PSTI2SCI block 616 may also be configured to determine respective addresses of the multiple endpoints based on configuration information stored by the apparatus 600.

As illustrated in FIG. 6A, an n-wide packet is provided to both the PSTI 612 and the PST2SCI block 616 (e.g., via n external pins of the apparatus 600, an n-wide port, SSN pins/port, etc.). In some examples, the PSTI 612 and the PST2SCI block 616 share the pins/port of the apparatus 600, but do not otherwise share any logic/circuitry of their respective blocks. In this example, a select circuit 618 is coupled to the PSTI 612 and the PST2SCI block 616. The select circuit 618 is configured to selectively enable only one of the PSTI 612 or the PSTI2SCI block 616 at a time to operate on the n-wide packets received at the pins/port of the apparatus 600. For example, an external pin on the apparatus 600 or a programmable register/bit internal to the apparatus 600 may be read by the select circuit 618 to enable/disable the PSTI 612 and/or the PSTI2SCI block 616. For example, the apparatus 600 may be incorporated in a SoC, a network-on-a-chip (NoC), or any of the systems/devices described herein. In one example, various elements of the apparatus 600 may be included in the system 1100. In particular, the PSTI2SCI block 616 may be integrated with the PCU 1117.

Figure 6B:
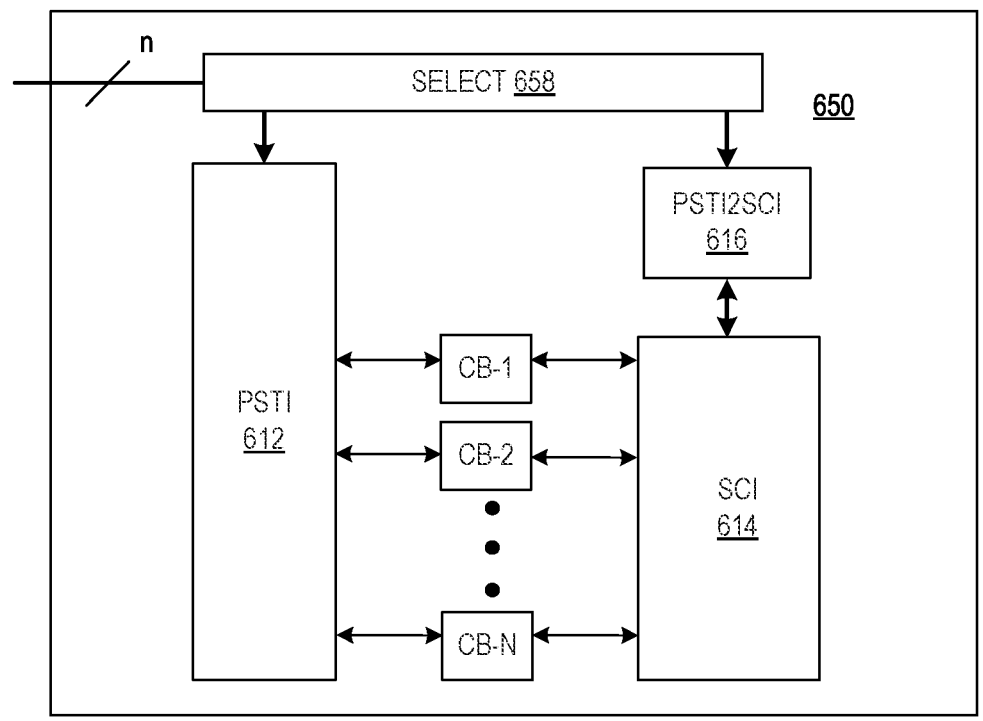
FIG. 6B is a block diagram of another apparatus with interface/unicast technology for test content, firmware, and software delivery in one implementation.

FIG. 6B shows an example of an apparatus 650 with similar elements as described in connection with the apparatus 600 indicated by like reference numerals. In some examples, the PSTI 612 and the PST2SCI block 616 share the pins/port of the apparatus 650, but do not otherwise share any logic/circuitry of their respective blocks. As illustrated in FIG. 6B, the n-wide packet is provided to a select circuit 658 that selectively provides the packets to one of either the PSTI 612 and the PST2SCI block 616 (e.g., via n external pins of the apparatus 600, an n-wide port, etc.). For example, the select circuit 658 may include a demultiplexer with an n-wide input and two n-wide outputs. In some examples, an external pin on the apparatus 650 or a programmable register/bit internal to the apparatus 650 may be read by the select circuit 658 to selectively output the packets received at the pins/port of the apparatus 650 to either the PSTI 612 or the PSTI2SCI block 616. For example, the apparatus 650 may be incorporated in a SoC, a network-on-a-chip (NoC), or any of the systems/devices described herein. In one example, various elements of the apparatus 650 may be included in the system 1100.

Some examples may provide a system/communication interface architecture for content, firmware, and/or software delivery, as well as for a unicast feature (e.g., sometimes referred to herein as SSN2SYSMEM), in a computing system that shares IO pins with a packetized SSN interface. Some examples may provide technology to piggy-back on a wide SSN interface to deliver other FW, SW, and test content. In particular, some examples provide technology to re-use the SSN pins to deliver FW, SW, and test content (e.g., only the SSN pins of the SSN interface are used and not the SSN logic). Some examples allow functional packets as well as test related packets to be transferred in parallel at a much high transfer rate via internal parallel interfaces to the internal memories.

Additionally, or alternatively, some examples provide technology to deliver FW, SW, and/or test related content to multiple-end points (e.g., sometimes referred to herein as unicast technology). Examples of unicast technology allow for further reduction in test times for testing and calibration of SERDES IOs, especially when multiple SERDES IOs of identical functionality are required to be tested.

In some examples, technology may be provided to re-use the SSN pins to deliver the FW, SW, and/or test content via a parallel path (e.g., a functional parallel path) to an Advanced eXtensible Interface (AXI) or to an x86 interface to deliver the packetized content via the AXI/x86 interface to the NoC fabric. With the addition of unicast technology, some examples may provide an extended capability to deliver the content to multiple interfaces for concurrent testing of multiple interfaces at the same time (e.g. a single SSN address packet may result in multiple responses on the SSN interface).

Instead of using the JTAG serial interface or adding additional pins for FW, SW and test content, some examples may provide an architecture for delivering test content for testing/calibration of high-speed IOs through the SSN interface (e.g., that is otherwise utilized for scan testing).

Figure 7:
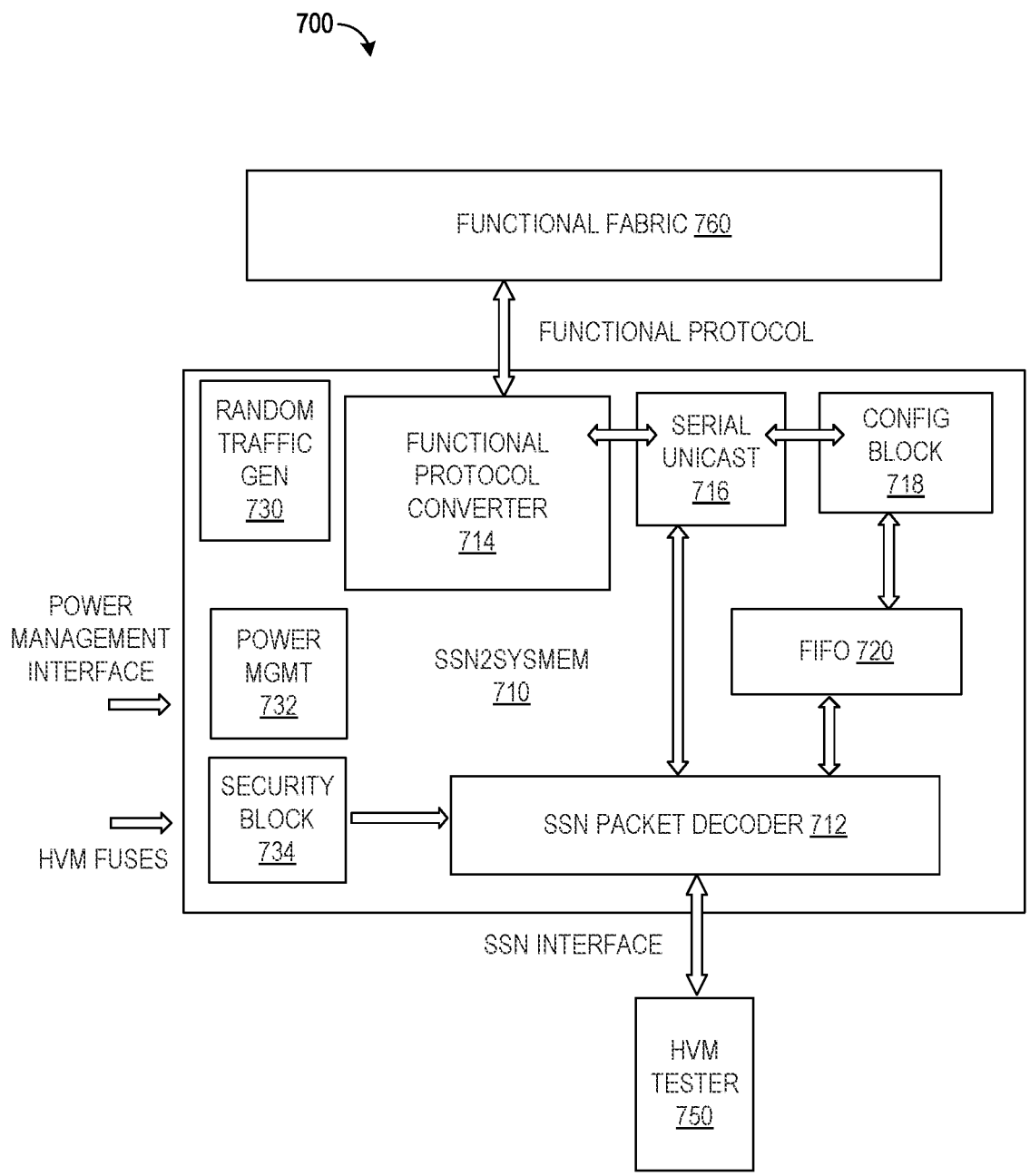
FIG. 7 is a block diagram of a system with interface/unicast technology for test content, firmware, and software delivery in one implementation.

FIG. 7 shows an example system 700 that includes a parallel packetized interface SSN2SYSMEM module 710 coupled between a high-volume manufacturing (HVM) tester 750 and a functional fabric 760 (e.g., AXI, Advanced Peripheral Bus (APB), PCIe protocol based fabric, etc.). The SSN2SYSMEM module 710 includes an SSN packet decoder 712, a functional protocol converter 714, a serial unicast block 716, a configuration block 718, and a first-in-first-out (FIFO) block 720, coupled as shown.

For example, the SSN packet decoder 712 is configured to decode the received packets into address and data information. Any suitable packet format may be utilized and the assignment of the bit positions within the bus may potentially vary based on the usage of SSN pins to read or write into configuration registers in the configuration block 718. For example, the functional protocol converter 714 may include suitable control logic (e.g., write and read finite state machines (FSMs)) to convert the information from the decoded SSN packets into the appropriate protocol for address and data-based access to the functional fabric 760. For example, the FIFO block 720 may store decoded data and decode addresses. The FIFO block 720 may be configured with any suitable depth and width based on the scan test frequency and second functional frequency. The SSN2SYSMEM module 710 may also include a random traffic generator 730 (e.g., utilizing linear feedback shift registers (LFSRs)), a power management block 732, and a security block 734.

The SSN interface is configured for delivery of parallel packets, which may be useful for sending ATPG parallel packets for stuck-at and at-speed manufacturing testing. The SSN2SYSMEM module 710 re-uses the same SSN interface to send packetized data to the IO interfaces for IO calibration and training purposes. The parallel packetized interface provided by the SSN2SYSMEM module 710 may be used to load the memories for IO testing using the wide parallel packet interface to deliver the IO test content faster. In addition, the serial unicast block 716 may be utilized to deliver patterns to multiple IOs and further reduce test-time (e.g., as described in further detail below).

In some examples described herein, an example system interface includes an AXI interface for purposes of illustration and not limitation. Those skilled in the art will appreciate that other examples may be interfaced to other system/communication interfaces (e.g., IOSF, etc.). The configuration registers as mentioned above may contain AXI transaction details as an example interface. For example, the configuration block 718 may include the configuration registers that may be utilized for converting from the SSN protocol to the AXI protocol. The registers that are utilized for conversion may be managed by control logic in the functional protocol converter 714 to launch transactions on to the functional fabric 760. For example, an FSM may be configured to launch write and read transactions into the functional fabric 760 utilizing an AXI bus protocol (e.g., an additional or alternative FSM may be configured to launch write and read transactions into the functional fabric 760 utilizing other interface protocols, such as x86, etc.). The write and read transactions into the functional fabric 760 are then used to write into any of the various memories on the system for use as test-content, or calibration of IOs, or any other suitable purpose.

For the system 700 to provide security and power management, some examples may incorporate HVM security fuses. When the HVM fuse(s) are blown, the ability for the functional bridge of the SSN2SYSMEM module 710 to send traffic from the HVM tester 750 to the functional fabric 760 is disabled (e.g., after testing is complete and before the device is sent to customers). The security block 734 makes sure that the SSN2SYSMEM module 710 can only be used in-house for manufacturing. In another example, however, if the SSN2SYSMEM module 710 is otherwise beneficial for loading memory via the parallel SSN interface, the security block 734 may provide other security provisions for writing functional traffic but avoiding the HVM path so as to prevent any security attacks.

In some examples, the power management block 732 may be configured to enable the SSN2SYSMEM module 710 only when the SSN2SYSMEM module 710 is in use. Otherwise, the SSN2SYSMEM module 710 may be power-gated off and dynamic and/or leakage power may also be saved by clock-gating.

Figure 8:
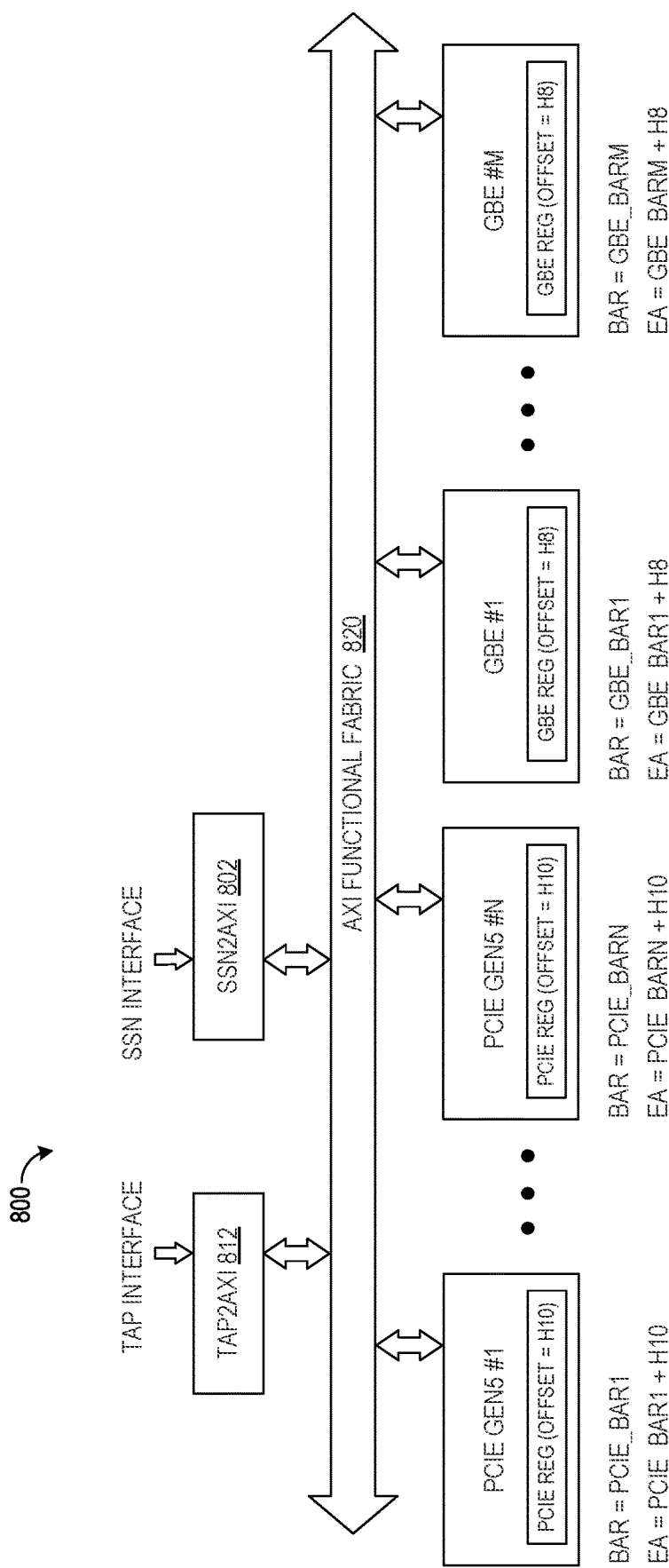
FIG. 8 is a block diagram of another system with interface/unicast technology for test content, firmware, and software delivery in one implementation.

FIG. 8 shows an example of a system 800 that includes an SSN2AXI module 802 and a TAP2AXI module 812 coupled to multiple IO interfaces via an AXI function fabric 820. For example, the multiple IO interfaces include at least PCIe generation five (Gen5) IO interfaces 1 through N and gigabit ethernet (GBE) IO interfaces 1 through M. As noted above, examples of serial unicast technology may enable loading the test content for testing of similar functional subsystems. In some examples, a serial unicast block may be configured to replicate a single packet with an indicated offset (OFF) to multiple packets BAR1+OFF, BAR2+OFF, . . . , BARn+OFF, where n corresponds to a number of similar instantiated subsystems, and where BAR is the Base Address Register of each of the similar instantiated subsystems and an effective address for the register corresponds to the BAR plus the indicated offset.

For example, a HVM tester may want to program a PCIe REG register of offset 1110 in all PCIe Gen5 Controllers. Because all PCIe Gen5 controllers in the tester's system are similar, the same PCIe REG register exists with the same offset='h10 in all the PCIe Gen5 controllers. To program N PCIe Gen5 controllers, without unicast technology, SSN packets bearing N different addresses need to be sent to each controller with address PCIE_BAR1+'h10, PCIE_BAR2+'h10, PCIE_BARN+'h10.

Similarly, for the GBE controllers, if the HVM tester wants to program a GBE register of offset 118 (e.g., and because all GBE controllers are similar, the same GBE register exists with same offset='h8 across all the GBE controllers), to program M GBE controllers, without unicast technology, SSN packets bearing M different addresses need to be sent each controller with address GBE_BAR1+'h8, GBE_BAR2+'h8, GBE_BARM+'h8.

In an example where the SSN2AXI module 802 employs the serial unicast technology, for PCIe Gen5 controllers to program PCIe REG (offset='h10), the HVM tester sends SSN packets bearing only one offset address ('h10). After the SSN2AXI module 802 receives this packet, the SSN2AXI module 802 replicates the information from the single SSN packet into N different AXI packets of address PCIE-_BAR1+'h10, PCIE_BAR2+'h10, . . . PCIE_BARN+'h10.

Similarly, for GBE controllers to program GBE REG (offset='h8), where the SSN2AXI module 802 employs the serial unicast technology, the HVM tester sends SSN packets bearing only one offset address ('h8). After the SSN2AXI module 802 receives this one packet, the SSN2AXI module 802 then replicates the information into M different packets of address GBE_BAR1+'h8, GBE_BAR2+'h8, GBE-_BARM+'h8.

Instead of sending SSN packets bearing M or N different AXI addresses, the HVM tester needs to send only SSN packets bearing one AXI address and the SSN2AXI module 802 will replicate this address, advantageously reducing the tester time.

One of the applications of the SSN2AXI module 802 is for delivering test content for HVM testing of high-speed serial IO interfaces. Depending on the width of the SSN interface and the packet format overhead, the parallel packetized interface of the SSN2AXI module 802 may be much faster as compared to the TAP2AXI module 812, because more bits of data may be delivered per clock cycle. For example, programming of a register for a controller may involve the transfer of 32-bits of data to the register location that is indicated by a 32-bit address. TAP-based delivery of that information involves at least 64 clock cycles (e.g., plus several more clock cycles of TAP overhead). For an example 16-bit wide SSN interface, an example SSN packet may include 12-bits of payload information (e.g., data bits). Accordingly, only six to nine clock cycles to transfer 32-bit address/data or for 64-bit address/32-bit data or vice-versa, may be utilized for the SSN packets constituting functional bus packets used to transfer to the system memory (AXI or IOSF etc.). Presuming a similar clock rate for the TAP and SSN interfaces, utilizing the SSN2AXI module 802 may save a substantial amount of test time. In some systems, the SSN interface may have a clock rate that is four times faster than the clock rate for the TAP interface. The amount of test time saved may be further multiplied when the test involves multiple similar controllers and the SSN2AXI module 802 utilizes the serial unicast technology to deliver replicated content to the multiple endpoints.

Figure 9:
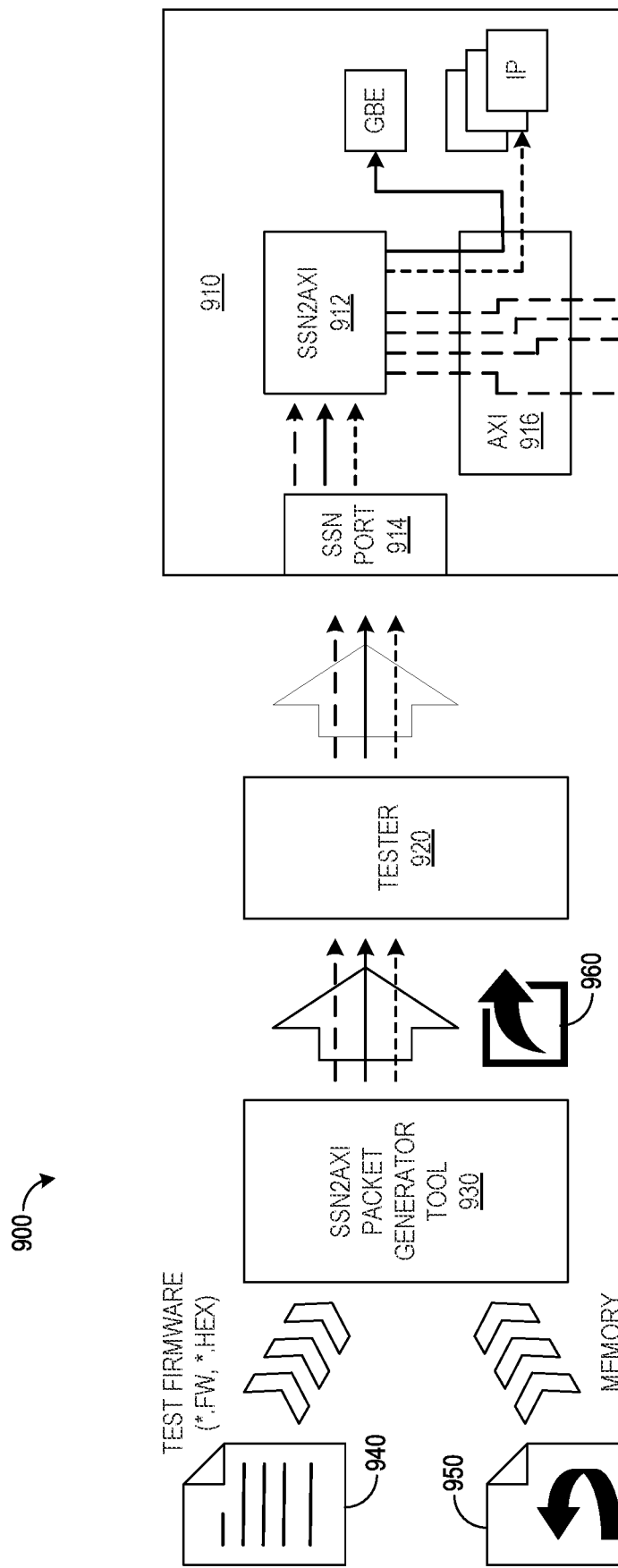
FIG. 9 is a block diagram of another system with interface/unicast technology for test content, firmware, and software delivery in one implementation.

FIG. 9 shows an example system 900 that includes a device 910 to be tested. The device 910 includes an SSN2AXI bridge 912 coupled between an SSN port 914 and AXI interface 916. The AXI interface 916 provides access to multiple circuit blocks such as the illustrated PCI blocks, GBE blocks, and other IP blocks. The system 900 further includes a tester 920 coupled to the SSN port 914 of the device 910 and an SSN2AXI packet generator tool 930 that converts inputs files such as test firmware 940 and memory access cycles 950 to a packetized test pattern 960 that is provided to the tester 920.

For example, the tool 930 may take test firmware files and convert the files to SSN2AXI-formatted packets to send to the system IO registers for testing PCI interfaces/devices, GBE interfaces/devices, SERDES interfaces/devise, non-IO devices, etc., at a much faster test speeds as compared to conventional TAP2AXI techniques. In some examples, test firmware files may be converted to an SSN2AXI packet format (e.g., that is otherwise compatible with SSN packet formats) as specified in an interface definition using the tool 930 to generate the test pattern 960 in a format that is compatible with the tester 920. The packetized test data is then passed through the SSN2AXI bridge 912 where the SSN2AXI packets get converted to AXI functional packets.

Figure 10:
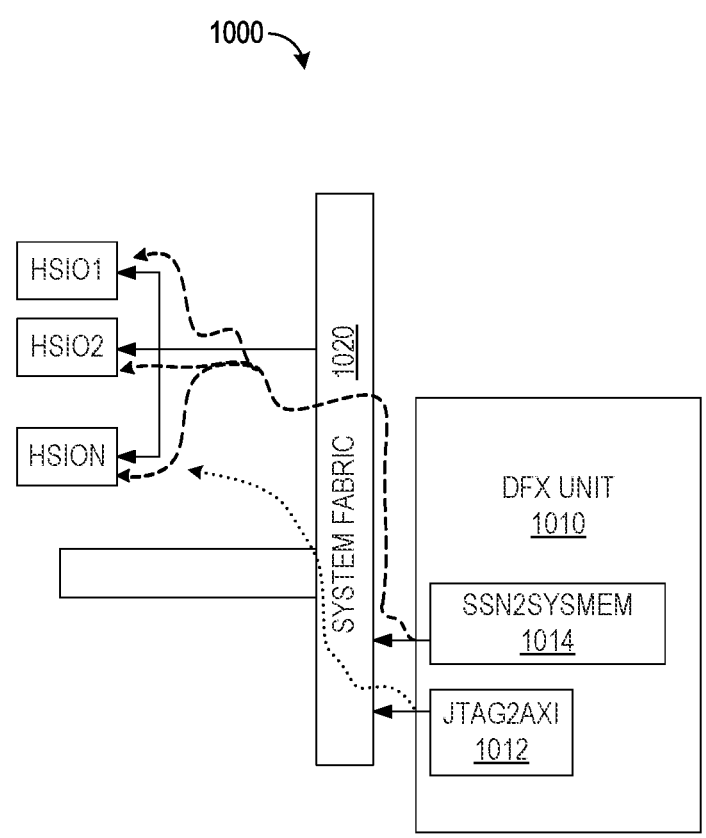
FIG. 10 is a block diagram of another system with interface/unicast technology for test content, firmware, and software delivery in one implementation.

FIG. 10 shows an example of a system 1000 that includes a design-for-test (DFX) unit 1010 coupled via a system fabric interface 1020 to multiple high-speed IO (HSIO) interfaces/devices. The DFX unit 1010 incorporates both a JTAG2AXI block 1012 and an SSN2SYSMEM 1014 where the JTAG2AXI block 1012 provides a low-bandwidth interface and the SSN2SYSMEM block 1014 provides a high-bandwidth interface (e.g., much higher bandwidth as compared to the JTAG2AXI block 1012). In some examples, the DFX unit 1010 advantageously utilizes an SSN HVM interface with the SSN2SYSMEM block 1014 acting as a testing agent and/or bridge to deliver test, FW, SW, and/or other content from the SSN HVM interface onto the functional system fabric interface 1020 to test the various HSIO interfaces. In some examples, the SSN2SYSMEM block 1014 may further include serial unicast technology in the hardware architecture to achieve even further test time reduction.

Exemplary Computer Architectures.

Detailed below are describes of exemplary computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 11:
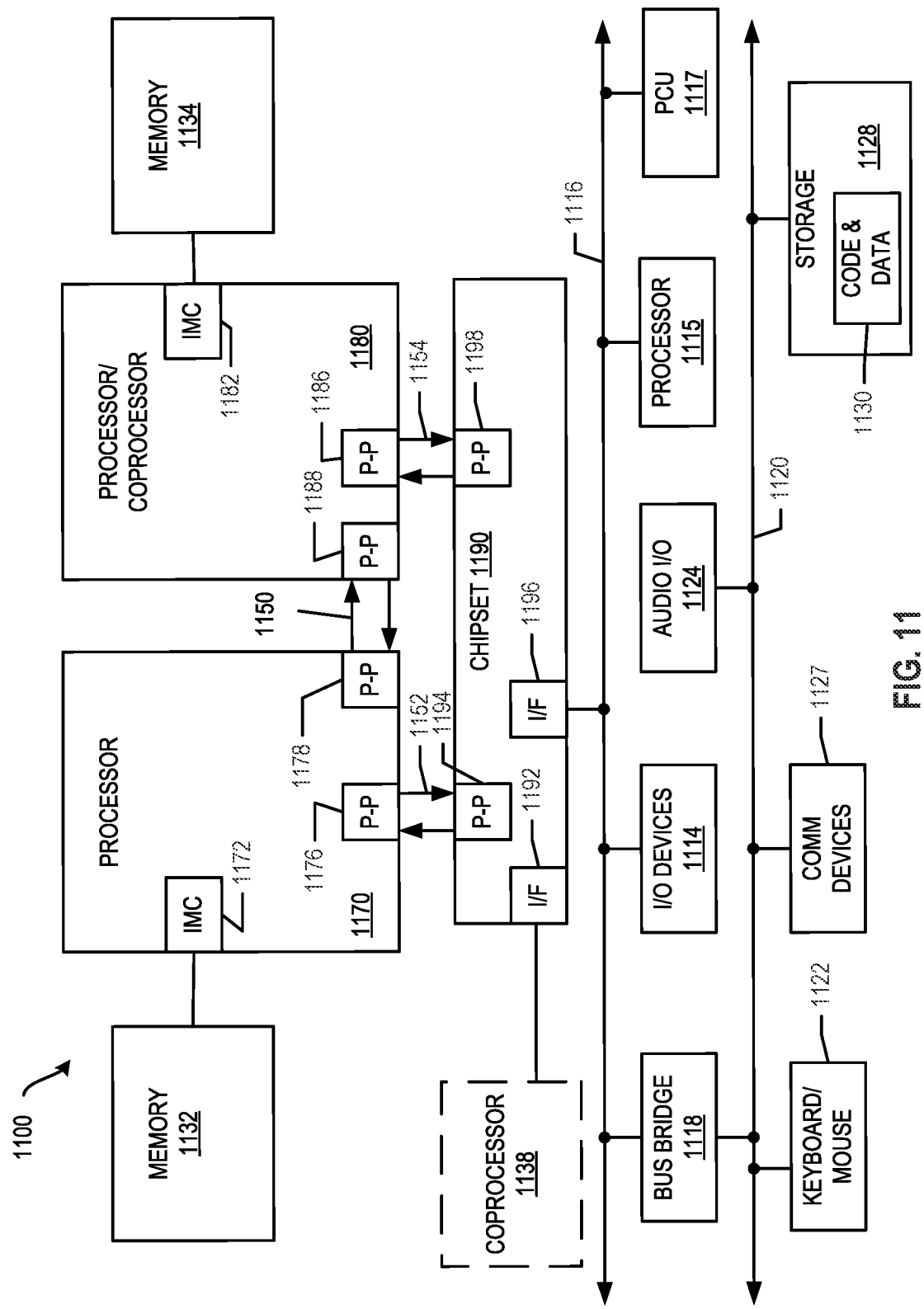
FIG. 11 illustrates an exemplary system.

FIG. 11 illustrates an exemplary system. Multiprocessor system 1100 is a point-to-point interconnect system and includes a plurality of processors including a first processor 1170 and a second processor 1180 coupled via a point-to-point interconnect 1150. In some examples, the first processor 1170 and the second processor 1180 are homogeneous. In some examples, first processor 1170 and the second processor 1180 are heterogenous. Though the exemplary system 1100 is shown to have two processors, the system may have three or more processors, or may be a single processor system.

Processors 1170 and 1180 are shown including integrated memory controller (IMC) circuitry 1172 and 1182, respectively. Processor 1170 also includes as part of its interconnect controller point-to-point (P-P) interfaces 1176 and 1178; similarly, second processor 1180 includes P-P interfaces 1186 and 1188. Processors 1170, 1180 may exchange information via the point-to-point (P-P) interconnect 1150 using P-P interface circuits 1178, 1188. IMCs 1172 and 1182 couple the processors 1170, 1180 to respective memories, namely a memory 1132 and a memory 1134, which may be portions of main memory locally attached to the respective processors.

Processors 1170, 1180 may each exchange information with a chipset 1190 via individual P-P interconnects 1152, 1154 using point to point interface circuits 1176, 1194, 1186, 1198. Chipset 1190 may optionally exchange information with a coprocessor 1138 via an interface 1192. In some examples, the coprocessor 1138 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 1170, 1180 or outside of both processors, yet connected with the processors via P-P interconnect, such that either or both processors' local cache information may be stored in the shared cache if a processor is placed into a low power mode.

Chipset 1190 may be coupled to a first interconnect 1116 via an interface 1196. In some examples, first interconnect 1116 may be a Peripheral Component Interconnect (PCI) interconnect, or an interconnect such as a PCI Express interconnect or another IO interconnect. In some examples, one of the interconnects couples to a power control unit (PCU) 1117, which may include circuitry, software, and/or firmware to perform power management operations with regard to the processors 1170, 1180 and/or co-processor 1138. PCU 1117 provides control information to a voltage regulator (not shown) to cause the voltage regulator to generate the appropriate regulated voltage. PCU 1117 also provides control information to control the operating voltage generated. In various examples, PCU 1117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1117 is illustrated as being present as logic separate from the processor 1170 and/or processor 1180. In other cases, PCU 1117 may execute on a given one or more of cores (not shown) of processor 1170 or 1180. In some cases, PCU 1117 may be implemented as a microcontroller (dedicated or general-purpose) or other control logic configured to execute its own dedicated power management code, sometimes referred to as P-code. In yet other examples, power management operations to be performed by PCU 1117 may be implemented externally to a processor, such as by way of a separate power management integrated circuit (PMIC) or another component external to the processor. In yet other examples, power management operations to be performed by PCU 1117 may be implemented within BIOS or other system software.

Various IO devices 1114 may be coupled to first interconnect 1116, along with a bus bridge 1118 which couples first interconnect 1116 to a second interconnect 1120. In some examples, one or more additional processor(s) 1115, such as coprocessors, high-throughput many integrated core (MIC) processors, GPGPUs, accelerators (such as graphics accelerators or digital signal processing (DSP) units), field programmable gate arrays (FPGAs), or any other processor, are coupled to first interconnect 1116. In some examples, second interconnect 1120 may be a low pin count (LPC) interconnect. Various devices may be coupled to second interconnect 1120 including, for example, a keyboard and/or mouse 1122, communication devices 1127 and a storage circuitry 1128. Storage circuitry 1128 may be one or more non-transitory machine-readable storage media as described below, such as a disk drive or other mass storage device which may include instructions/code and data 1130. Further, an audio IO 1124 may be coupled to second interconnect 1120. Note that other architectures than the point-to-point architecture described above are possible. For example, instead of the point-to-point architecture, a system such as multiprocessor system 1100 may implement a multi-drop interconnect or other such architecture.

Exemplary Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may include on the same die as the described CPU (sometimes referred to as the application core(s) or application processor(s)), the above described coprocessor, and additional functionality. Exemplary core architectures are described next, followed by descriptions of exemplary processors and computer architectures.

Figure 12:
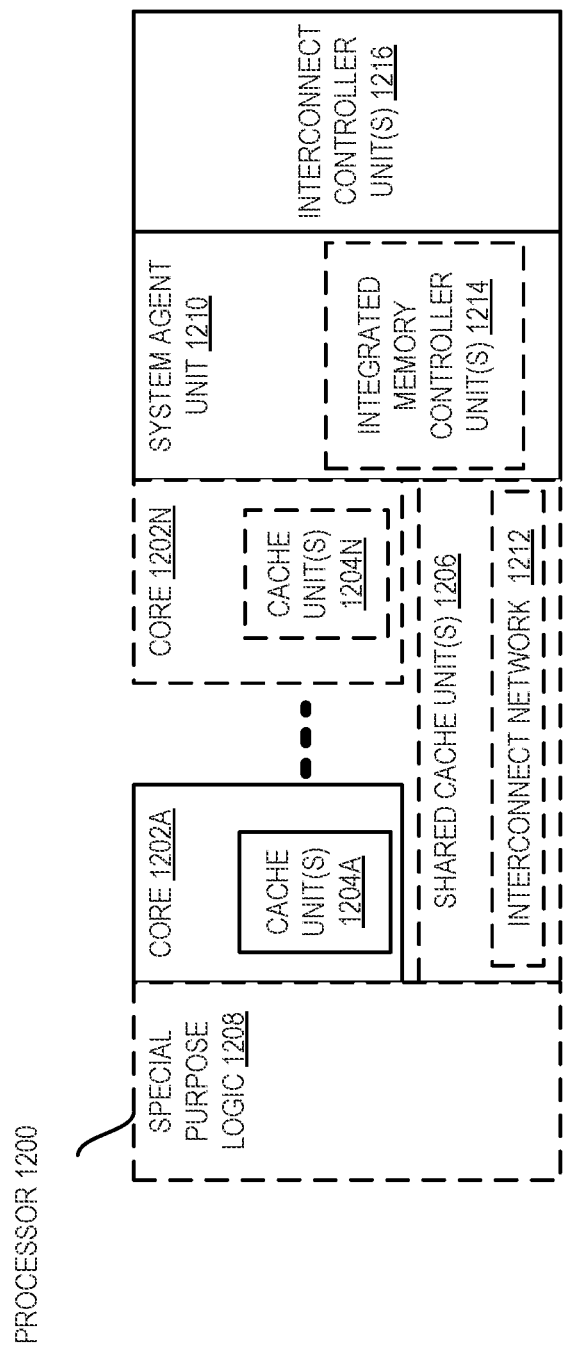
FIG. 12 illustrates a block diagram of an example processor that may have more than one core and an integrated memory controller.

FIG. 12 illustrates a block diagram of an example processor 1200 that may have more than one core and an integrated memory controller. The solid lined boxes illustrate a processor 1200 with a single core 1202A, a system agent unit circuitry 1210, a set of one or more interconnect controller unit(s) circuitry 1216, while the optional addition of the dashed lined boxes illustrates an alternative processor 1200 with multiple cores 1202(A)-(N), a set of one or more integrated memory controller unit(s) circuitry 1214 in the system agent unit circuitry 1210, and special purpose logic 1208, as well as a set of one or more interconnect controller units circuitry 1216. Note that the processor 1200 may be one of the processors 1170 or 1180, or co-processor 1138 or 1115 of FIG. 11.

Thus, different implementations of the processor 1200 may include: 1) a CPU with the special purpose logic 1208 being integrated graphics and/or scientific (throughput) logic (which may include one or more cores, not shown), and the cores 1202(A)-(N) being one or more general purpose cores (e.g., general purpose in-order cores, general purpose out-of-order cores, or a combination of the two); 2) a coprocessor with the cores 1202(A)-(N) being a large number of special purpose cores intended primarily for graphics and/or scientific (throughput); and 3) a coprocessor with the cores 1202(A)-(N) being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1204(A)-(N) within the cores 1202(A)-(N), a set of one or more shared cache unit(s) circuitry 1206, and external memory (not shown) coupled to the set of integrated memory controller unit(s) circuitry 1214. The set of one or more shared cache unit(s) circuitry 1206 may include one or more mid-level caches, such as level 2 (L2), level 3 (L3), level 4 (L4), or other levels of cache, such as a last level cache (LLC), and/or combinations thereof. While in some examples ring-based interconnect network circuitry 1212 interconnects the special purpose logic 1208 (e.g., integrated graphics logic), the set of shared cache unit(s) circuitry 1206, and the system agent unit circuitry 1210, alternative examples use any number of well-known techniques for interconnecting such units. In some examples, coherency is maintained between one or more of the shared cache unit(s) circuitry 1206 and cores 1202(A)-(N).

In some examples, one or more of the cores 1202(A)-(N) are capable of multi-threading. The system agent unit circuitry 1210 includes those components coordinating and operating cores 1202(A)-(N). The system agent unit circuitry 1210 may include, for example, power control unit (PCU) circuitry and/or display unit circuitry (not shown). The PCU may be or may include logic and components needed for regulating the power state of the cores 1202(A)-(N) and/or the special purpose logic 1208 (e.g., integrated graphics logic). The display unit circuitry is for driving one or more externally connected displays.

The cores 1202(A)-(N) may be homogenous in terms of instruction set architecture (ISA). Alternatively, the cores 1202(A)-(N) may be heterogeneous in terms of ISA; that is, a subset of the cores 1202(A)-(N) may be capable of executing an ISA, while other cores may be capable of executing only a subset of that ISA or another ISA.

Exemplary Core Architectures-In-order and out-of-order core block diagram.

Figure 13A:
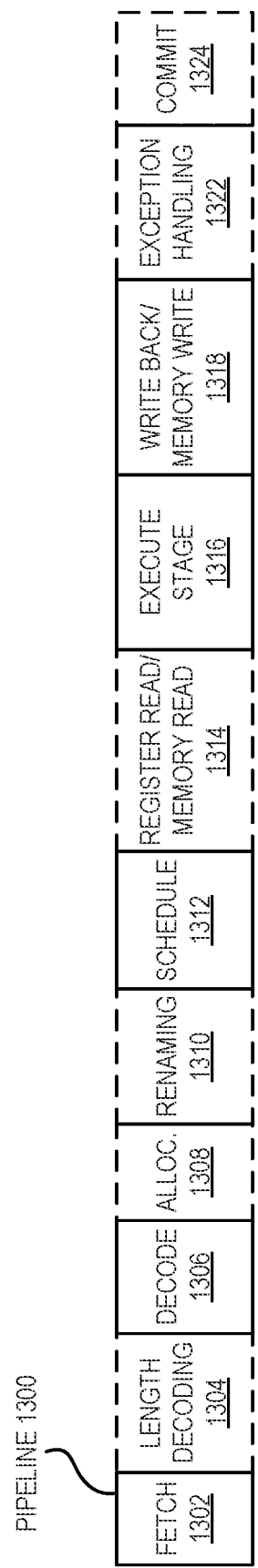
FIG. 13A is a block diagram illustrating both an exemplary in-order pipeline and an exemplary register renaming, out-of-order issue/execution pipeline according to examples.
Figure 13B:
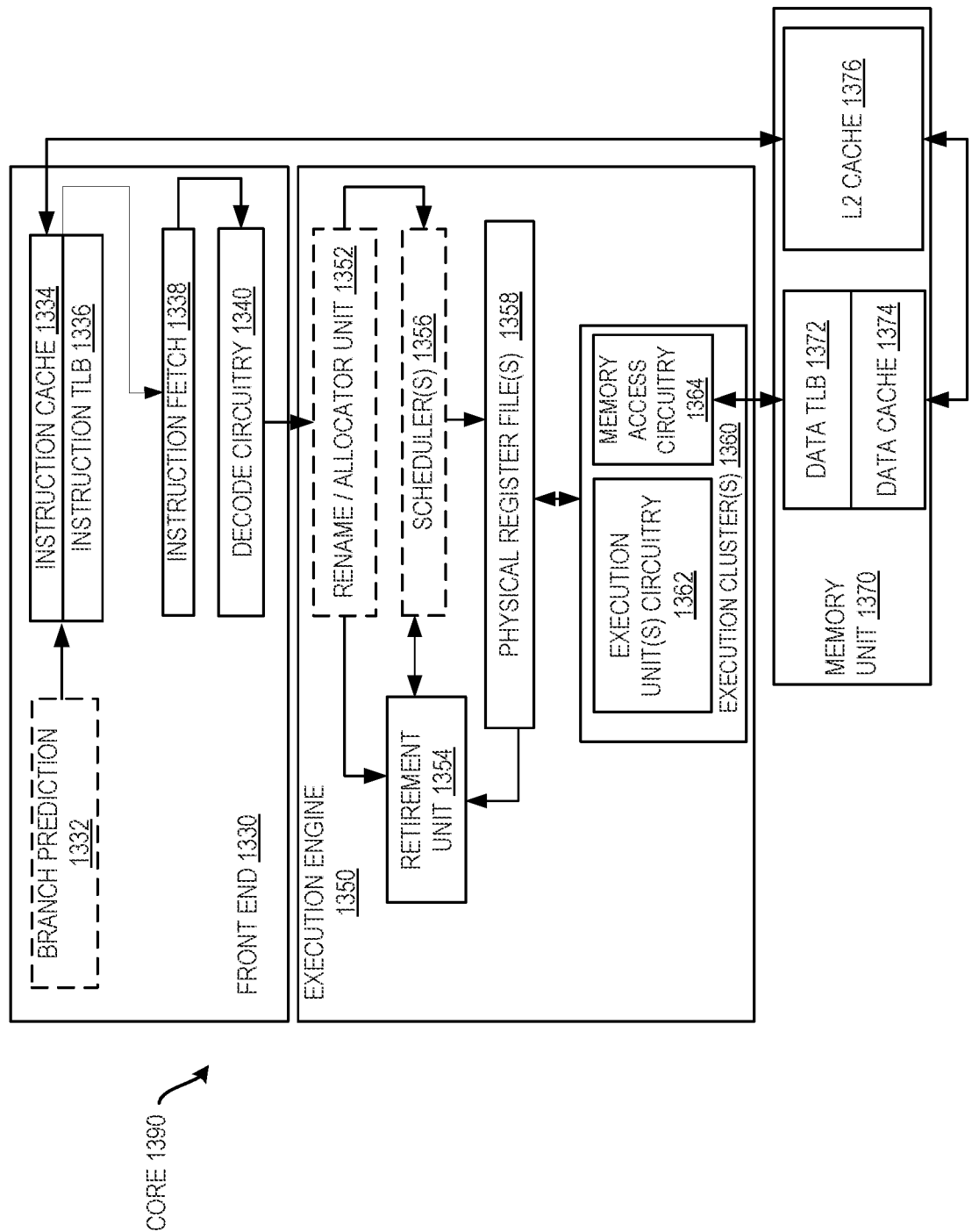
FIG. 13B is a block diagram illustrating both an exemplary example of an in-order architecture core and an exemplary register renaming, out-of-order issue/execution architecture core to be included in a processor according to examples.

FIG. 13A is a block diagram illustrating both an exemplary in-order pipeline and an exemplary register renaming, out-of-order issue/execution pipeline according to examples. FIG. 13B is a block diagram illustrating both an exemplary example of an in-order architecture core and an exemplary register renaming, out-of-order issue/execution architecture core to be included in a processor according to examples. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, an optional length decoding stage 1304, a decode stage 1306, an optional allocation (Alloc) stage 1308, an optional renaming stage 1310, a schedule (also known as a dispatch or issue) stage 1312, an optional register read/memory read stage 1314, an execute stage 1316, a write back/memory write stage 1318, an optional exception handling stage 1322, and an optional commit stage 1324. One or more operations can be performed in each of these processor pipeline stages. For example, during the fetch stage 1302, one or more instructions are fetched from instruction memory, and during the decode stage 1306, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1306 and the register read/memory read stage 1314 may be combined into one pipeline stage. In one example, during the execute stage 1316, the decoded instructions may be executed, LSU address/data pipelining to an Advanced Microcontroller Bus (AMB) interface may be performed, multiply and add operations may be performed, arithmetic operations with branch results may be performed, etc.

By way of example, the exemplary register renaming, out-of-order issue/execution architecture core of FIG. 13B may implement the pipeline 1300 as follows: 1) the instruction fetch circuitry 1338 performs the fetch and length decoding stages 1302 and 1304; 2) the decode circuitry 1340 performs the decode stage 1306; 3) the rename/allocator unit circuitry 1352 performs the allocation stage 1308 and renaming stage 1310; 4) the scheduler(s) circuitry 1356 performs the schedule stage 1312; 5) the physical register file(s) circuitry 1358 and the memory unit circuitry 1370 perform the register read/memory read stage 1314; the execution cluster(s) 1360 perform the execute stage 1316; 6) the memory unit circuitry 1370 and the physical register file(s) circuitry 1358 perform the write back/memory write stage 1318; 7) various circuitry may be involved in the exception handling stage 1322; and 8) the retirement unit circuitry 1354 and the physical register file(s) circuitry 1358 perform the commit stage 1324.

FIG. 13B shows a processor core 1390 including front-end unit circuitry 1330 coupled to an execution engine unit circuitry 1350, and both are coupled to a memory unit circuitry 1370. The core 1390 may be a reduced instruction set architecture computing (RISC) core, a complex instruction set architecture computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit circuitry 1330 may include branch prediction circuitry 1332 coupled to an instruction cache circuitry 1334, which is coupled to an instruction translation lookaside buffer (TLB) 1336, which is coupled to instruction fetch circuitry 1338, which is coupled to decode circuitry 1340. In one example, the instruction cache circuitry 1334 is included in the memory unit circuitry 1370 rather than the front-end circuitry 1330. The decode circuitry 1340 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1340 may further include an address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1340 may be implemented using various different mechanisms. Examples of suitable mechanisms include, but are not limited to, look-up tables, hardware implementations, programmable logic arrays (PLAs), microcode read only memories (ROMs), etc. In one example, the core 1390 includes a microcode ROM (not shown) or other medium that stores microcode for certain macroinstructions (e.g., in decode circuitry 1340 or otherwise within the front end circuitry 1330). In one example, the decode circuitry 1340 includes a micro-operation (micro-op) or operation cache (not shown) to hold/cache decoded operations, micro-tags, or micro-operations generated during the decode or other stages of the processor pipeline 1300. The decode circuitry 1340 may be coupled to rename/allocator unit circuitry 1352 in the execution engine circuitry 1350.

The execution engine circuitry 1350 includes the rename/allocator unit circuitry 1352 coupled to a retirement unit circuitry 1354 and a set of one or more scheduler(s) circuitry 1356. The scheduler(s) circuitry 1356 represents any number of different schedulers, including reservations stations, central instruction window, etc. In some examples, the scheduler(s) circuitry 1356 can include arithmetic logic unit (ALU) scheduler/scheduling circuitry, ALU queues, arithmetic generation unit (AGU) scheduler/scheduling circuitry, AGU queues, etc. The scheduler(s) circuitry 1356 is coupled to the physical register file(s) circuitry 1358. Each of the physical register file(s) circuitry 1358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1358 includes vector registers unit circuitry, writemask registers unit circuitry, and scalar register unit circuitry. These register units may provide architectural vector registers, vector mask registers, general-purpose registers, etc. The physical register file(s) circuitry 1358 is coupled to the retirement unit circuitry 1354 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1354 and the physical register file(s) circuitry 1358 are coupled to the execution cluster(s) 1360. The execution cluster(s) 1360 includes a set of one or more execution unit(s) circuitry 1362 and a set of one or more memory access circuitry 1364. The execution unit(s) circuitry 1362 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1356, physical register file(s) circuitry 1358, and execution cluster(s) 1360 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1364). It should also be understood that where separate pipelines are used, one or more of these pipelines may be out-of-order issue/execution and the rest in-order.

In some examples, the execution engine unit circuitry 1350 may perform load store unit (LSU) address/data pipelining to an Advanced Microcontroller Bus (AMB) interface (not shown), and address phase and writeback, data phase load, store, and branches.

The set of memory access circuitry 1364 is coupled to the memory unit circuitry 1370, which includes data TLB circuitry 1372 coupled to a data cache circuitry 1374 coupled to a level 2 (L2) cache circuitry 1376. In one exemplary example, the memory access circuitry 1364 may include a load unit circuitry, a store address unit circuit, and a store data unit circuitry, each of which is coupled to the data TLB circuitry 1372 in the memory unit circuitry 1370. The instruction cache circuitry 1334 is further coupled to the level 2 (L2) cache circuitry 1376 in the memory unit circuitry 1370. In one example, the instruction cache 1334 and the data cache 1374 are combined into a single instruction and data cache (not shown) in L2 cache circuitry 1376, a level 3 (L3) cache circuitry (not shown), and/or main memory. The L2 cache circuitry 1376 is coupled to one or more other levels of cache and eventually to a main memory.

The core 1390 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1390 includes logic to support a packed data instruction set architecture extension (e.g., AVX1, AVX2), thereby allowing the operations used by many multimedia applications to be performed using packed data.

Exemplary Execution Unit(s) Circuitry.

Figure 14:
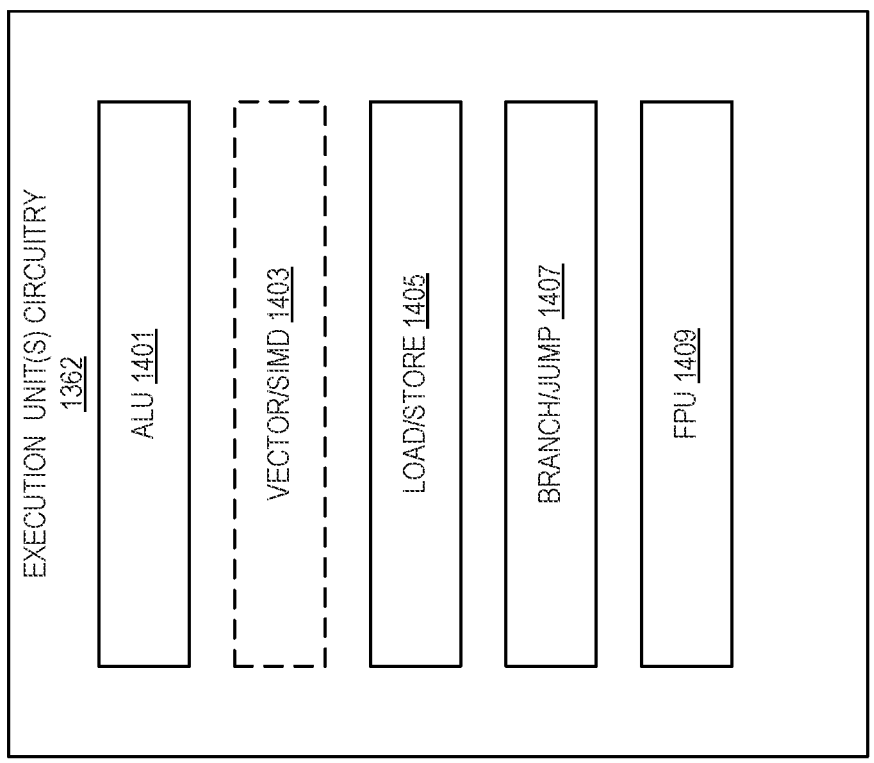
FIG. 14 illustrates examples of execution unit(s) circuitry.

FIG. 14 illustrates examples of execution unit(s) circuitry, such as execution unit(s) circuitry 1362 of FIG. 13B. As illustrated, execution unit(s) circuity 1362 may include one or more ALU circuits 1401, optional vector/single instruction multiple data (SIMD) circuits 1403, load/store circuits 1405, branch/jump circuits 1407, and/or Floating-point unit (FPU) circuits 1409. ALU circuits 1401 perform integer arithmetic and/or Boolean operations. Vector/SIMD circuits 1403 perform vector/SIMD operations on packed data (such as SIMD/vector registers). Load/store circuits 1405 execute load and store instructions to load data from memory into registers or store from registers to memory. Load/store circuits 1405 may also generate addresses. Branch/jump circuits 1407 cause a branch or jump to a memory address depending on the instruction. FPU circuits 1409 perform floating-point arithmetic. The width of the execution unit(s) circuitry 1362 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Exemplary Register Architecture

Figure 15:
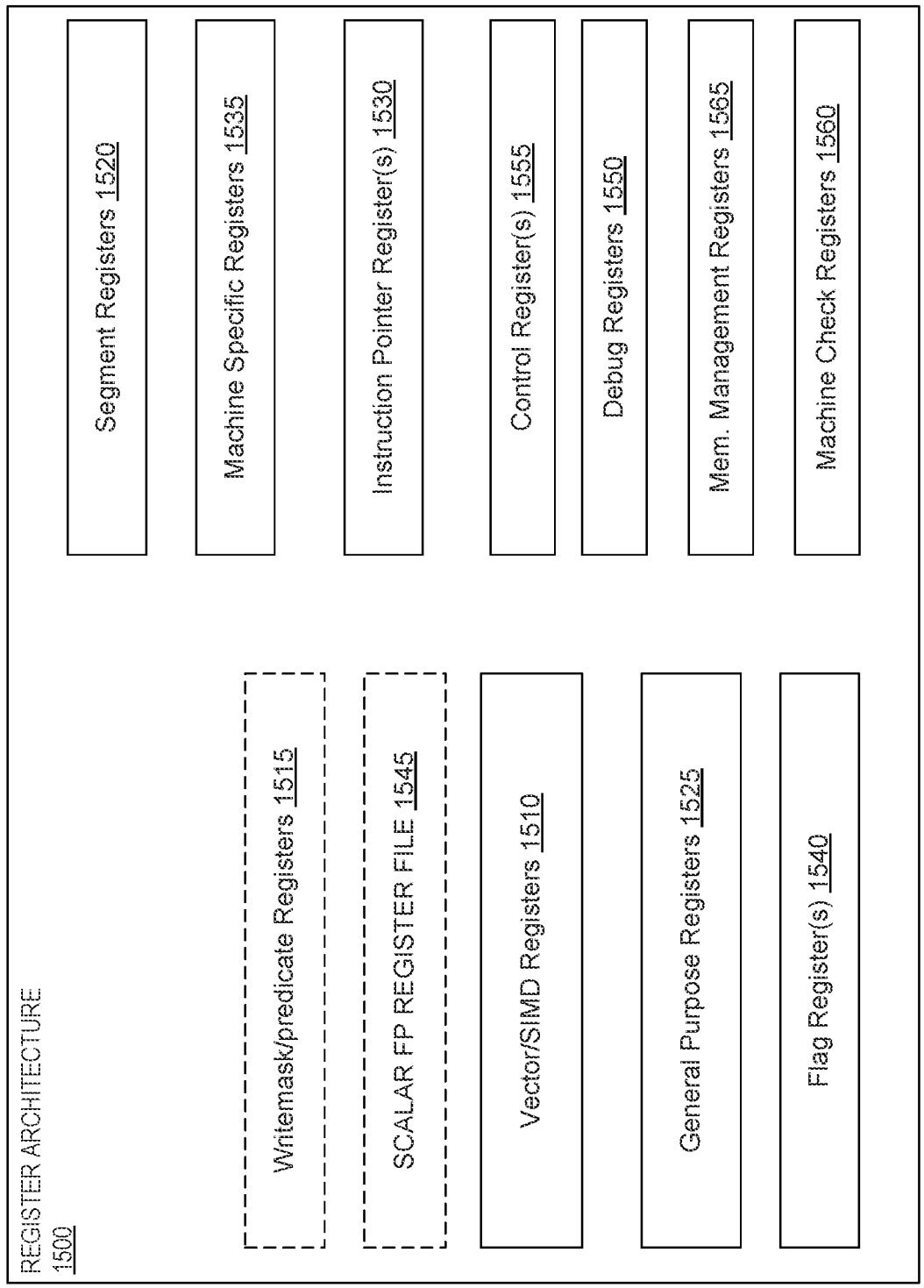
FIG. 15 is a block diagram of a register architecture according to some examples.

FIG. 15 is a block diagram of a register architecture 1500 according to some examples. As illustrated, the register architecture 1500 includes vector/SIMD registers 1510 that vary from 128-bit to 1,024 bits width. In some examples, the vector/SIMD registers 1510 are physically 512-bits and, depending upon the mapping, only some of the lower bits are used. For example, in some examples, the vector/SIMD registers 1510 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1500 includes writemask/predicate registers 1515. For example, in some examples, there are 8 writemask/predicate registers (sometimes called k0 through k7) that are each 16-bit, 32-bit, 64-bit, or 128-bit in size. Writemask/predicate registers 1515 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1515 corresponds to a data element position of the destination. In other examples, the writemask/predicate registers 1515 are scalable and consists of a set number of enable bits for a given vector element (e.g., 8 enable bits per 64-bit vector element).

The register architecture 1500 includes a plurality of general-purpose registers 1525. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1500 includes scalar floating-point (FP) register 1545 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1540 (e.g., EFLAGS, RFLAGS, etc.) store status and control information for arithmetic, compare, and system operations. For example, the one or more flag registers 1540 may store condition code information such as carry, parity, auxiliary carry, zero, sign, and overflow. In some examples, the one or more flag registers 1540 are called program status and control registers.

Segment registers 1520 contain segment points for use in accessing memory. In some examples, these registers are referenced by the names CS, DS, SS, ES, FS, and GS.

Machine specific registers (MSRs) 1535 control and report on processor performance. Most MSRs 1535 handle system-related functions and are not accessible to an application program. Machine check registers 1560 consist of control, status, and error reporting MSRs that are used to detect and report on hardware errors.

One or more instruction pointer register(s) 1530 store an instruction pointer value. Control register(s) 1555 (e.g., CR0-CR4) determine the operating mode of a processor (e.g., processor 1170, 1180, 1138, 1115, and/or 1200) and the characteristics of a currently executing task. Debug registers 1550 control and allow for the monitoring of a processor or core's debugging operations.

Memory (mem) management registers 1565 specify the locations of data structures used in protected mode memory management. These registers may include a GDTR, IDRT, task register, and a LDTR register.

Alternative examples may use wider or narrower registers. Additionally, alternative examples may use more, less, or different register files and registers. The register architecture 1500 may, for example, be used in register file/memory, or physical register file(s) circuitry 1358.

Emulation (including binary translation, code morphing, etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 illustrates a block diagram contrasting the use of a software instruction converter to convert binary instructions in a source instruction set architecture to binary instructions in a target instruction set architecture according to examples. In the illustrated example, the instruction converter is a software instruction converter, although alternatively the instruction converter may be implemented in software, firmware, hardware, or various combinations thereof. FIG. 16 shows a program in a high-level language 1602 may be compiled using a first ISA compiler 1604 to generate first ISA binary code 1606 that may be natively executed by a processor with at least one first instruction set architecture core 1616. The processor with at least one first ISA instruction set architecture core 1616 represents any processor that can perform substantially the same functions as an Intel® processor with at least one first ISA instruction set architecture core by compatibly executing or otherwise processing (1) a substantial portion of the instruction set architecture of the first ISA instruction set architecture core or (2) object code versions of applications or other software targeted to run on an Intel processor with at least one first ISA instruction set architecture core, in order to achieve substantially the same result as a processor with at least one first ISA instruction set architecture core. The first ISA compiler 1604 represents a compiler that is operable to generate first ISA binary code 1606 (e.g., object code) that can, with or without additional linkage processing, be executed on the processor with at least one first ISA instruction set architecture core 1616. Similarly, FIG. 16 shows the program in the high-level language 1602 may be compiled using an alternative instruction set architecture compiler 1608 to generate alternative instruction set architecture binary code 1610 that may be natively executed by a processor without a first ISA instruction set architecture core 1614. The instruction converter 1612 is used to convert the first ISA binary code 1606 into code that may be natively executed by the processor without a first ISA instruction set architecture core 1614. This converted code is not necessarily to be the same as the alternative instruction set architecture binary code 1610; however, the converted code will accomplish the general operation and be made up of instructions from the alternative instruction set architecture. Thus, the instruction converter 1612 represents software, firmware, hardware, or a combination thereof that, through emulation, simulation or any other process, allows a processor or other electronic device that does not have a first ISA instruction set architecture processor or core to execute the first ISA binary code 1606.

Techniques and architectures for interface conversion/unicast for content, firmware, and software delivery are described herein. In the above description, for purposes of explanation, numerous specific details are set forth in order to provide a thorough understanding of certain examples. It will be apparent, however, to one skilled in the art that certain examples can be practiced without these specific details. In other instances, structures and devices are shown in block diagram form in order to avoid obscuring the description Additional Notes and Examples Example 1 includes an apparatus comprising two or more circuit blocks, a scan test interface coupled to the two or more circuits blocks to perform a scan test for the two or more circuit blocks, and circuitry coupled to IO signals of the scan test interface to provide content for the two or more circuit blocks and to deliver a replicated content to multiple endpoints of the two or more circuit blocks.

Example 2 includes the apparatus of Example 1, wherein the circuitry is further to determine respective addresses of the multiple endpoints based on stored configuration information.

Example 3 includes the apparatus of Example 2, wherein the circuitry is further to determine the respective addresses of the multiple endpoints based on respective base addresses of each endpoint of the multiple endpoints stored in the configuration information and an offset received through the IO signals of the scan test interface.

Example 4 includes the apparatus of any of Examples 1 to 3, wherein the scan test interface comprises a packetized scan test interface, further comprising a second interface coupled to the two or more circuit blocks to provide address and data-based access to the two or more circuit blocks, wherein the circuitry is coupled to the IO signals of the packetized scan test interface and the second interface and wherein the circuitry is further to decode packets received at the IO signals and convert the decoded packets to provide content through the second interface for the two or more circuit blocks.

Example 5 includes the apparatus of Example 4, wherein the circuitry is further to selectively utilize the packetized scan test interface to perform the scan test for the two or more circuit blocks and the second interface to provide content to the two or more circuit blocks.

Example 6 includes the apparatus of any of Examples 4 to 5, wherein the circuitry is further to determine the respective addresses of the multiple endpoints based on respective base addresses of each endpoint of the multiple endpoints stored in configuration information and an offset indicated in a decoded packet received through the IO signals of the packetized scan test interface.

Example 7 includes the apparatus of any of Examples 4 to 6, wherein the circuitry is further to convert the decoded packets into one or more of system memory address space and high-speed IO address space.

Example 8 includes a method comprising providing a scan test interface to perform a scan test for two or more circuit blocks, providing content received at IO signals of the scan test interface to the two or more circuit blocks, and delivering a replicated content to multiple endpoints of the two or more circuit blocks.

Example 9 includes the method of Example 8, further comprising determining respective addresses of the multiple endpoints based on stored configuration information.

Example 10 includes the method of Example 9, further comprising determining the respective addresses of the multiple endpoints based on respective base addresses of each endpoint of the multiple endpoints stored in the configuration information and an offset received through the IO signals of the scan test interface.

Example 11 includes the method of any of Examples 8 to 10, wherein the scan test interface comprises a packetized scan test interface, further comprising providing a second interface for address and data-based access to the two or more circuit blocks, decoding packets received at the IO signals, and converting the decoded packets to provide content through the second interface for the two or more circuit blocks.

Example 12 includes the method of Example 11, further comprising selectively utilizing the packetized scan test interface to perform the scan test for the two or more circuit blocks and the second interface to provide content to the two or more circuit blocks.

Example 13 includes the method of any of Examples 11 to 12, further comprising determining the respective addresses of the multiple endpoints based on respective base addresses of each endpoint of the multiple endpoints stored in configuration information and an offset indicated in a decoded packet received through the IO signals of the packetized scan test interface.

Example 14 includes the method of any of Examples 11 to 13, further comprising converting the decoded packets into one or more of system memory address space and high-speed IO address space.

Example 15 includes an apparatus comprising two or more circuit blocks, a first interface coupled to the two or more circuits blocks to decode packets to perform a scan test for the two or more circuit blocks, a second interface coupled to the two or more circuit blocks to provide to provide address and data-based access to the two or more circuit blocks, and circuitry coupled to the first interface and the second interface to decode packets for the second interface and convert the decoded packets to provide content through the second interface for the two or more circuit blocks.

Example 16 includes the apparatus of Example 15, wherein the content is one or more of test content, firmware, and software.

Example 17 includes the apparatus of any of Examples 15 to 16, wherein the first interface comprises a packetized scan test interface.

Example 18 includes the apparatus of Example 17, wherein the circuitry is further to selectively utilize the packetized scan test interface to perform the scan test for the two or more circuit blocks and the second interface to provide content to the two or more circuit blocks.

Example 19 includes the apparatus of any of Examples 15 to 18, wherein the second interface comprises one or more of a system interface and a communication interface.

Example 20 includes the apparatus of Example 19, wherein the circuitry is further to convert the decoded packets into system memory address space.

Example 21 includes the apparatus of any of Examples 19 to 20, wherein the circuitry is further to convert the decoded packets into high-speed IO address space.

Example 22 includes the apparatus of any of Examples 15 to 21, wherein the circuitry is further to deliver a replicated content from one or more decoded packets to multiple endpoints of the two or more circuit blocks.

Example 23 includes the apparatus of Example 22, wherein the circuitry is further to determine respective addresses of the multiple endpoints based on stored configuration information.

Example 24 includes a method comprising providing a first interface to decode packets to perform a scan test for two or more circuit blocks, providing a second interface for address and data-based access to the two or more circuit blocks, decoding packets for the second interface, and converting the decoded packets to provide content through the second interface for the two or more circuit blocks.

Example 25 includes the method of Example 24, wherein the content is one or more of test content, firmware, and software.

Example 26 includes the method of any of Examples 24 to 25, wherein the first interface comprises a packetized scan test interface.

Example 27 includes the method of Example 26, further comprising selectively utilizing the packetized scan test interface to perform the scan test for the two or more circuit blocks and the second interface to provide content to the two or more circuit blocks.

Example 28 includes the method of any of Examples 24 to 27, wherein the second interface comprises one or more of a system interface and a communication interface.

Example 29 includes the method of Example 28, further comprising converting the decoded packets into system memory address space.

Example 30 includes the method of any of Examples 28 to 29, further comprising converting the decoded packets into high-speed IO address space.

Example 31 includes the method of any of Examples 24 to 30, further comprising delivering a replicated content from one or more decoded packets to multiple endpoints of the two or more circuit blocks.

Example 32 includes the method of Example 31, further comprising determining respective addresses of the multiple endpoints based on stored configuration information.

Example 33 includes an apparatus comprising means for providing a first interface to decode packets to perform a scan test for two or more circuit blocks, means for providing a second interface for address and data-based access to the two or more circuit blocks, means for decoding packets for the second interface, and means for converting the decoded packets to provide content through the second interface for the two or more circuit blocks.

Example 34 includes the apparatus of Example 33, wherein the content is one or more of test content, firmware, and software.

Example 35 includes the apparatus of any of Examples 33 to 34, wherein the first interface comprises a packetized scan test interface.

Example 36 includes the apparatus of Example 35, further comprising means for selectively utilizing the packetized scan test interface to perform the scan test for the two or more circuit blocks and the second interface to provide content to the two or more circuit blocks.

Example 37 includes the apparatus of any of Examples 33 to 36, wherein the second interface comprises one or more of a system interface and a communication interface.

Example 38 includes the apparatus of Example 37, further comprising means for converting the decoded packets into system memory address space.

Example 39 includes the apparatus of any of Examples 37 to 38, further comprising means for converting the decoded packets into high-speed IO address space.

Example 40 includes the apparatus of any of Examples 33 to 39, further comprising means for delivering a replicated content from one or more decoded packets to multiple endpoints of the two or more circuit blocks.

Example 41 includes the apparatus of Example 40, further comprising means for determining respective addresses of the multiple endpoints based on stored configuration information.

Example 42 includes at least one non-transitory one machine readable medium comprising a plurality of instructions that, in response to being executed on a computing device, cause the computing device to provide a first interface to decode packets to perform a scan test for two or more circuit blocks, provide a second interface for address and data-based access to the two or more circuit blocks, decode packets for the second interface, and convert the decoded packets to provide content through the second interface for the two or more circuit blocks.

Example 43 includes the at least one non-transitory one machine readable medium of Example 42, wherein the content is one or more of test content, firmware, and software.

Example 44 includes the at least one non-transitory one machine readable medium of any of Examples 42 to 43, wherein the first interface comprises a packetized scan test interface.

Example 45 includes the at least one non-transitory one machine readable medium of Example 44, comprising a plurality of further instructions that, in response to being executed on the computing device, cause the computing device to selectively utilize the packetized scan test interface to perform the scan test for the two or more circuit blocks and the second interface to provide content to the two or more circuit blocks.

Example 46 includes the at least one non-transitory one machine readable medium of any of Examples 42 to 45, wherein the second interface comprises one or more of a system interface and a communication interface.

Example 47 includes the at least one non-transitory one machine readable medium of Example 46, comprising a plurality of further instructions that, in response to being executed on the computing device, cause the computing device to convert the decoded packets into system memory address space.

Example 48 includes the at least one non-transitory one machine readable medium of Example 46 to 47, comprising a plurality of further instructions that, in response to being executed on the computing device, cause the computing device to convert the decoded packets into high-speed IO address space.

Example 49 includes the at least one non-transitory one machine readable medium of Example 42 to 48, comprising a plurality of further instructions that, in response to being executed on the computing device, cause the computing device to deliver a replicated content from one or more decoded packets to multiple endpoints of the two or more circuit blocks.

Example 50 includes the at least one non-transitory one machine readable medium of Example 49, comprising a plurality of further instructions that, in response to being executed on the computing device, cause the computing device to determine respective addresses of the multiple endpoints based on stored configuration information.

Example 51 includes an apparatus comprising means for providing a scan test interface to perform a scan test for two or more circuit blocks, means for providing content received at IO signals of the scan test interface to the two or more circuit blocks, and means for delivering a replicated content to multiple endpoints (e.g., identical endpoints, substantially identical endpoints, functionally equivalent endpoints, etc.) of the two or more circuit blocks.

Example 52 includes the apparatus of Example 51, further comprising means for determining respective addresses of the multiple endpoints based on stored configuration information.

Example 53 includes the apparatus of Example 52, further comprising means for determining the respective addresses of the multiple endpoints based on respective base addresses of each endpoint of the multiple endpoints stored in the configuration information and an offset received through the IO signals of the scan test interface.

Example 54 includes the apparatus of any of Examples 51 to 53, wherein the scan test interface comprises a packetized scan test interface, further comprising means for providing a second interface for address and data-based access to the two or more circuit blocks, means for decoding packets received at the IO signals, and means for converting the decoded packets to provide content through the second interface for the two or more circuit blocks.

Example 55 includes the apparatus of Example 54, further comprising means for selectively utilizing the packetized scan test interface to perform the scan test for the two or more circuit blocks and the second interface to provide content to the two or more circuit blocks.

Example 56 includes the apparatus of any of Examples 54 to 55, further comprising means for determining the respective addresses of the multiple endpoints based on respective base addresses of each endpoint of the multiple endpoints stored in configuration information and an offset indicated in a decoded packet received through the IO signals of the packetized scan test interface.

Example 57 includes the apparatus of any of Examples 54 to 56, further comprising means for converting the decoded packets into one or more of system memory address space and high-speed IO address space.

Example 58 includes at least one non-transitory one machine readable medium comprising a plurality of instructions that, in response to being executed on a computing device, cause the computing device to provide a scan test interface to perform a scan test for two or more circuit blocks, provide content for the two or more circuit blocks, and deliver a replicated content to multiple endpoints of the two or more circuit blocks.

Example 59 includes the at least one non-transitory one machine readable medium of Example 58, comprising a plurality of further instructions that, in response to being executed on the computing device, cause the computing device to determine respective addresses of the multiple endpoints based on stored configuration information.

Example 60 includes the at least one non-transitory one machine readable medium of Example 59, comprising a plurality of further instructions that, in response to being executed on the computing device, cause the computing device to determine the respective addresses of the multiple endpoints based on respective base addresses of each endpoint of the multiple endpoints stored in the configuration information and an offset received through the IO signals of the scan test interface.

Example 61 includes the at least one non-transitory one machine readable medium of any of Examples 58 to 60, wherein the scan test interface comprises a packetized scan test interface, comprising a plurality of further instructions that, in response to being executed on the computing device, cause the computing device to provide a second interface for address and data-based access to the two or more circuit blocks, decode packets received at the IO signals, and convert the decoded packets to provide content through the second interface for the two or more circuit blocks.

Example 62 includes the at least one non-transitory one machine readable medium of Example 61, comprising a plurality of further instructions that, in response to being executed on the computing device, cause the computing device to selectively utilize the packetized scan test interface to perform the scan test for the two or more circuit blocks and the second interface to provide content to the two or more circuit blocks.

Example 63 includes the at least one non-transitory one machine readable medium of any of Examples 61 to 62, comprising a plurality of further instructions that, in response to being executed on the computing device, cause the computing device to determine the respective addresses of the multiple endpoints based on respective base addresses of each endpoint of the multiple endpoints stored in configuration information and an offset indicated in a decoded packet received through the IO signals of the packetized scan test interface.

Example 64 includes the at least one non-transitory one machine readable medium of any of Examples 61 to 63, comprising a plurality of further instructions that, in response to being executed on the computing device, cause the computing device to convert the decoded packets into one or more of system memory address space and high-speed IO address space.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
   two or more circuit blocks;
   a scan test interface coupled to two or more circuit blocks comprising respective endpoints, the scan test interface comprising one or more input/output (IO) contacts by which the apparatus is to be coupled to a tester device, wherein the scan test interface is to receive scan test data from the tester device with each of the one or more IO contacts, and wherein the scan test interface is to perform a scan test of the two or more circuit blocks with the scan test data; and
   circuitry coupled to the scan test interface, wherein the scan test interface is further to receive first packetized data with each of the one or more IO contacts, and wherein the circuitry is to:
      receive the first packetized data via the scan test interface;
      replicate the first packetized data to generate second packetized data, comprising the circuitry to generate a first plurality of packets each based on a first packet of the first packetized data; and
      provide packets of the second packetized data each to a different respective circuit block of the two or more circuit blocks;
   wherein:
      multiple addresses each correspond to a different respective endpoint of the respective endpoints of the two or more circuit blocks; and
      the circuitry to generate the first plurality of packets comprises the circuitry to determine respective addresses of the first plurality of packets each based on both:
         an offset address to be communicated to the circuitry via the one or more IO contacts; and
         a different respective one of the multiple addresses.

2. The apparatus of claim 1, wherein:
   the respective endpoints of the two or more circuit blocks each comprise a respective IO interface; and
   the second packetized data is to be packetized IO calibration data.

3. The apparatus of claim 1, wherein the second packetized data is to be one of:
   packetized firmware data; or
   packetized software data.

4. The apparatus of claim 1, wherein:
   the one or more IO contacts are further to receive third packetized data; and
   the circuitry is further to:
      receive the third packetized data via the scan test interface;
      replicate the third packetized data to generate fourth packetized data, comprising the circuitry to generate a second plurality of packets each based on a second packet of the third packetized data; and
      provide packets of the fourth packetized data each to a different respective circuit block of the two or more circuit blocks.

5. The apparatus of claim 4, wherein:
   the offset address is to be a first offset address; and
   the circuitry to generate the second plurality of packets comprises the circuitry to:
      determine respective addresses of the second plurality of packets each based on both:
         a second offset address to be communicated to the circuitry via the one or more IO contacts of the scan test interface; and
         a different respective one of the multiple addresses.

6. The apparatus of claim 1, wherein the scan test interface is compatible with a scan test interface standard identified in a Joint Test Action Group specification.

7. The apparatus of claim 1, wherein the circuitry to generate the second packetized data comprises the circuitry to convert packets into one or more of a system memory address space or a high-speed IO address space.

8. A method comprising:
   providing a scan test interface which is coupled to two or more circuit blocks comprising respective endpoints, the scan test interface comprising one or more input/output (IO) contacts;
   receiving scan test data from a tester device with each of the one or more IO contacts;
   performing a scan test of the two or more circuit blocks with the scan test interface based on the scan test data;
   receiving first packetized data with each of the one or more IO contacts;
   replicating the first packetized data to generate second packetized data, comprising generating a first plurality of packets each based on a first packet of the first packetized data; and
   provide packets of the second packetized data each to a different respective circuit block of the two or more circuit blocks;
   wherein:
      multiple addresses each correspond to a different respective endpoint of the respective endpoints of the two or more circuit blocks; and
      generating the first plurality of packets comprises determining respective addresses of the first plurality of packets each based on both:
         an offset address communicated via the one or more IO contacts of the scan test interface; and
         a different respective one of the multiple addresses.

9. The method of claim 8, wherein:
   the respective endpoints of the two or more circuit blocks each comprise a respective IO interface; and
   the second packetized data is packetized IO calibration data.

10. The method of claim 8, wherein the second packetized data is one of:
    packetized firmware data; or
    packetized software data.

11. The method of claim 8, further comprising:
receiving third packetized data via the one or more IO contacts;
replicating the third packetized data to generate fourth packetized data, comprising generating a second plurality of packets each based on a second packet of the third packetized data; and
providing packets of the fourth packetized data each to a different respective circuit block of the two or more circuit blocks.

12. The method of claim 11, wherein:
the offset address is a first offset address; and
generating the second plurality of packets comprises determining respective addresses of the second plurality of packets each based on both:
a second offset address to be communicated via the one or more IO contacts of the scan test interface; and
a different respective one of the multiple addresses.

13. The method of claim 8, wherein the scan test interface is compatible with a scan test interface standard identified in a Joint Test Action Group specification.

14. The method of claim 8, wherein generating the second packetized data comprises converting packets into one or more of a system memory address space or a high-speed IO address space.

15. An apparatus comprising:
two or more circuit blocks comprising respective endpoints;
a first interface coupled to the two or more circuit blocks, the first interface comprising one or more input/output (IO) contacts by which the apparatus is to be coupled to a tester device, wherein the first interface is to receive scan test data from the tester device with each of the one or more IO contacts, and wherein the first interface is to perform a scan test of the two or more circuit blocks with the scan test data;
circuitry coupled to the first interface, wherein the first interface is further to receive first packetized data with each of the one or more IO contacts, and wherein the circuitry is to:
receive the first packetized data via the first interface;
replicate the first packetized data to generate second packetized data, comprising the circuitry to generate a first plurality of packets each based on a first packet of the first packetized data;
receive third packetized data with each of the one or more IO contacts of the first interface;
replicate the third packetized data to generate fourth packetized data, comprising the circuitry to generate a second plurality of packets each based on a second packet of the third packetized data; and
provide packets of the second packetized data each to a different respective circuit block of the two or more circuit blocks; and
a second interface coupled to the circuitry, the second interface to provide packets of the fourth packetized data each to a different respective circuit block of the two or more circuit blocks;
wherein:
multiple addresses each correspond to a different respective endpoint of the respective endpoints of the two or more circuit blocks; and
the circuitry to generate the first plurality of packets comprises the circuitry to determine respective addresses of the first plurality of packets each based on both:
an offset address to be communicated to the circuitry via the one or more IO contacts of the first interface; and
a different respective one of the multiple addresses.

16. The apparatus of claim 15, wherein the second packetized data is to be one of:
packetized firmware data; or
packetized software data.

17. The apparatus of claim 15, wherein the first interface is compatible with a scan test interface standard identified in a Joint Test Action Group specification.

18. The apparatus of claim 17, wherein:
the respective endpoints of the two or more circuit blocks each comprise a respective IO interface; and the second packetized data is to be packetized IO calibration data.

19. The apparatus of claim 15, wherein;
the offset address is to be a first offset address; and
the circuitry to generate the second plurality of packets comprises the circuitry to:
determine respective addresses of the second plurality of packets each based on both:
a second offset address to be communicated to the circuitry via the one or more IO contacts of the first interface; and
a different respective one of the multiple addresses.

20. The apparatus of claim 15, wherein the circuitry to generate the second packetized data comprises the circuitry to convert packets into a system memory address space.

21. The apparatus of claim 15, wherein the circuitry to generate the second packetized scan test data and the second packetized data comprises the circuitry to convert packets into a high-speed IO address space.

* * * * *